United States Patent
Patel et al.

(10) Patent No.: US 12,498,537 B1
(45) Date of Patent: Dec. 16, 2025

(54) FLEXURE MODULE COMPONENT CONFIGURATIONS FOR CAMERA WITH MOVEABLE IMAGE SENSOR

(71) Applicant: Apple Inc., Cupertino, CA (US)

(72) Inventors: Himesh Patel, Fremont, CA (US); Anup K Sharma, Sunnyvale, CA (US); Kai Min, San Jose, CA (US); Ho Seop Jeong, Palo Alto, CA (US); Qiang Yang, Fremont, CA (US)

(73) Assignee: Apple Inc., Cupertino, CA (US)

( * ) Notice: Subject to any disclaimer, the term of this patent is extended or adjusted under 35 U.S.C. 154(b) by 579 days.

(21) Appl. No.: 17/932,257

(22) Filed: Sep. 14, 2022

(51) Int. Cl.
*G02B 7/09* (2021.01)
*H04N 23/55* (2023.01)

(52) U.S. Cl.
CPC .............. *G02B 7/09* (2013.01); *H04N 23/55* (2023.01)

(58) Field of Classification Search
CPC ... G02B 7/02; G02B 7/09; G02B 7/10; G02B 7/102; H04N 23/55; H04N 23/60
USPC ......................................... 359/819, 822, 823
See application file for complete search history.

(56) References Cited

U.S. PATENT DOCUMENTS

| | | | |
|---|---|---|---|
| 9,294,667 B2 | 3/2016 | Lipson et al. | |
| 9,977,254 B2 * | 5/2018 | Kim | G03B 5/00 |
| 10,965,848 B1 * | 3/2021 | Ba-Tis | B81B 3/0062 |
| 11,194,115 B1 * | 12/2021 | Miller | G02B 7/02 |
| 2016/0109681 A1 * | 4/2016 | Lam | G02B 7/28 |
| | | | 359/824 |
| 2016/0259177 A1 * | 9/2016 | Ladwig | F03G 7/06143 |
| 2019/0020822 A1 * | 1/2019 | Sharma | G02B 27/646 |
| 2020/0259993 A1 * | 8/2020 | Brodie | H04N 23/687 |
| 2020/0314338 A1 * | 10/2020 | Johnson | H04N 23/68 |
| 2020/0344417 A1 * | 10/2020 | Xu | G03B 3/10 |
| 2021/0132327 A1 * | 5/2021 | Sharma | H02P 25/034 |
| 2021/0409604 A1 * | 12/2021 | Sharma | H04N 23/687 |
| 2022/0019128 A1 * | 1/2022 | Ng | H04N 23/687 |
| 2022/0053136 A1 * | 2/2022 | Sommer | H04N 23/54 |
| 2022/0094853 A1 * | 3/2022 | Xu | H04N 23/54 |

FOREIGN PATENT DOCUMENTS

| | | |
|---|---|---|
| WO | 2014026202 | 2/2014 |
| WO | 2018165535 | 9/2018 |

* cited by examiner

*Primary Examiner* — Bumsuk Won
*Assistant Examiner* — Seth D Moser
(74) *Attorney, Agent, or Firm* — Robert C. Kowert; Kowert, Hood, Munyon, Rankin & Goetzel, P.C.

(57) ABSTRACT

A camera includes a lens carrier to which lens(es), defining an optical axis, are mounted. The lens carrier and the lens(es) are movable along the optical axis. The camera includes an autofocus (AF) damping structure for dampening motion of the lens carrier and the lens(es) in a direction along the optical axis. The camera includes a flexure platform having a dynamic platform to which an image sensor and a substrate are connected for movement together with the dynamic platform, a static platform connected to a static portion of the camera, and multiple flexure arms that mechanically connect the dynamic platform to the static platform. The camera includes electronic component(s) and a volume of space vertically aligned with the AF damping structure and extending from the AF damping structure to the substrate. The volume of space does not include a mounting location of the electronic component(s).

20 Claims, 24 Drawing Sheets

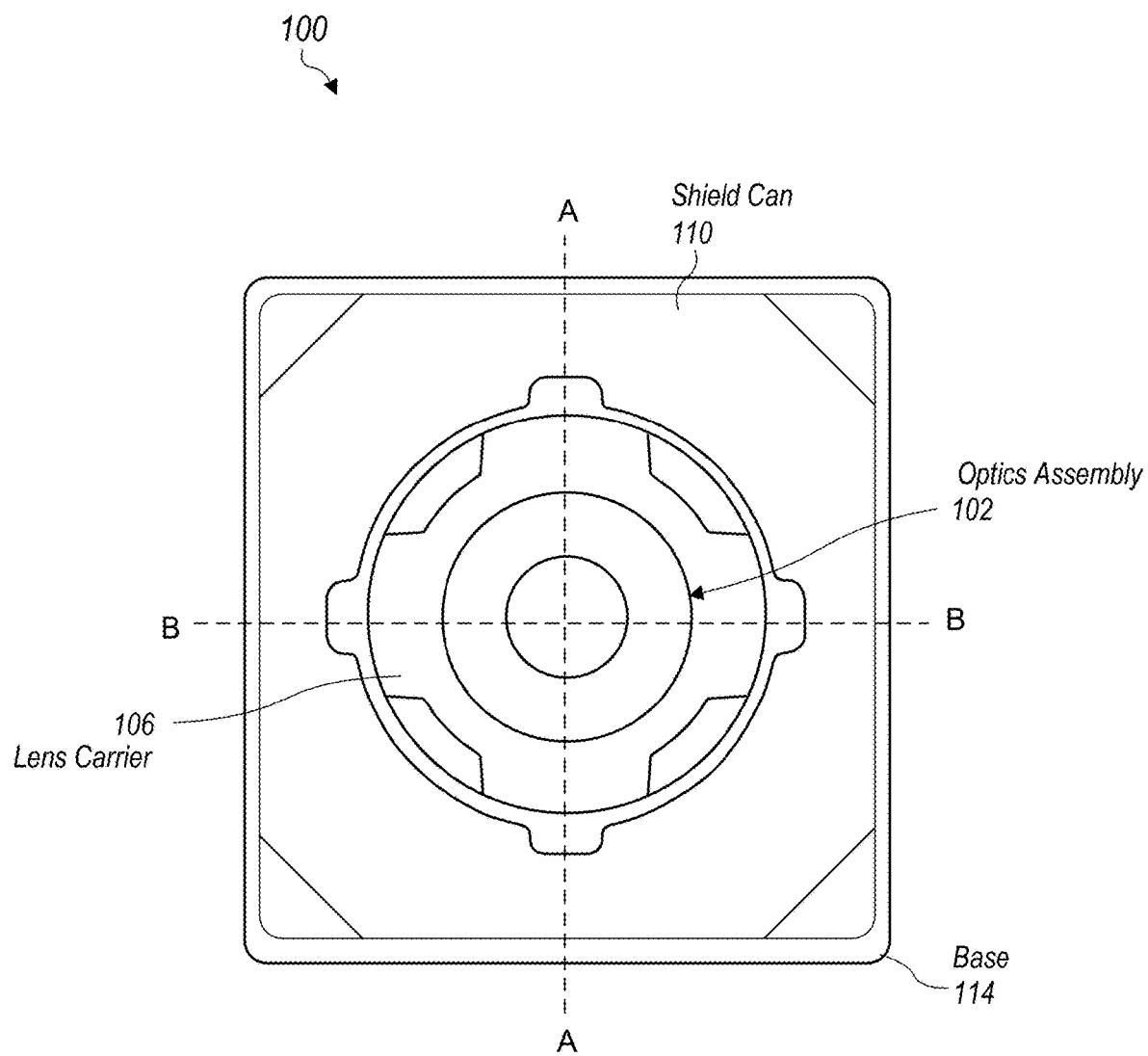
FIG. 1
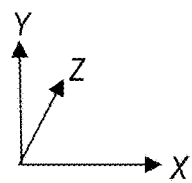

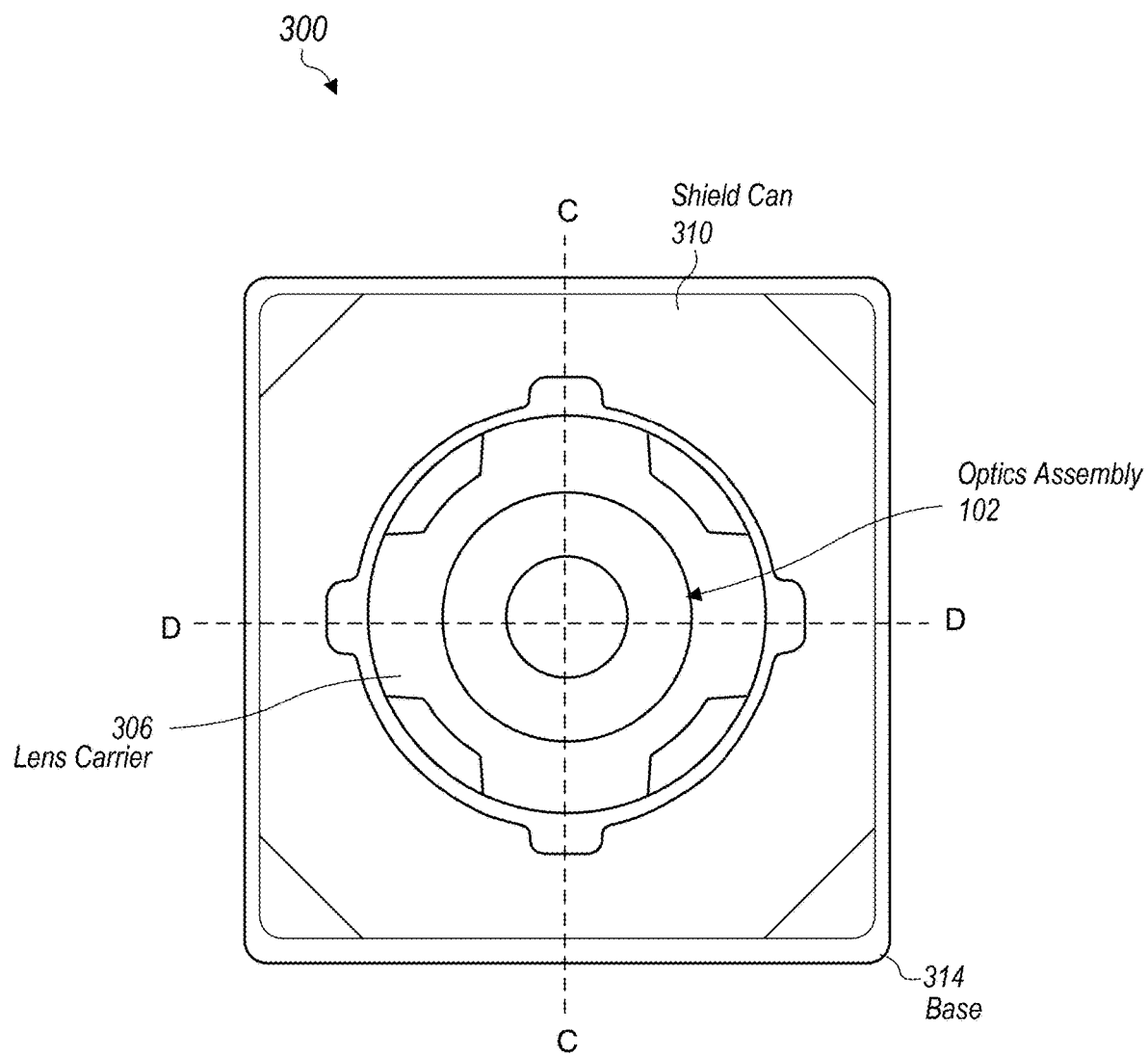
FIG. 3
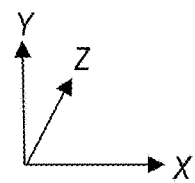

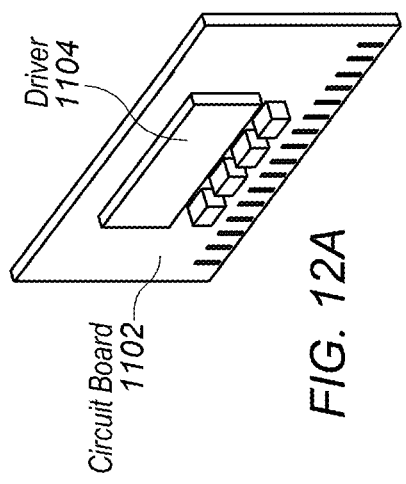
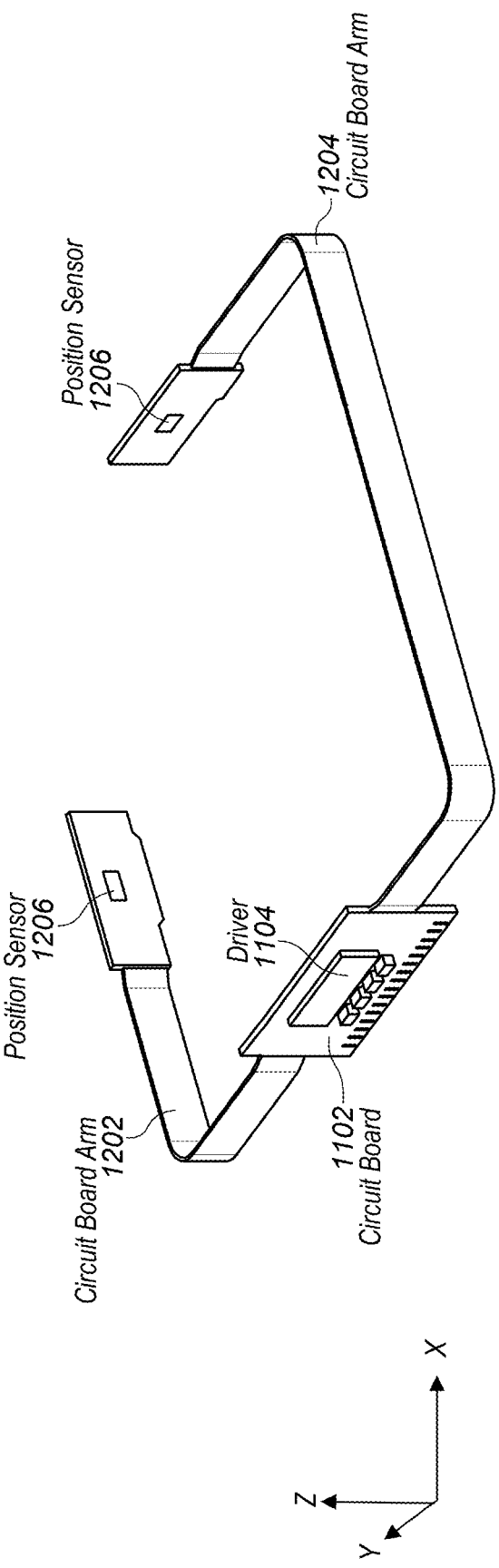

FLEXURE MODULE COMPONENT CONFIGURATIONS FOR CAMERA WITH MOVEABLE IMAGE SENSOR

BACKGROUND

Technical Field

This disclosure relates generally to flexure module component configurations, high speed data transfer, and remote sensing for a camera with a moveable image sensor.

Description of the Related Art

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

BRIEF DESCRIPTION OF THE DRAWINGS

FIGS. 1, 2A, and 2B illustrate components of an example camera having an actuator module or assembly that may, for example, be used to provide autofocus through optics assembly movement and/or optical image stabilization through image sensor movement in small form factor cameras, according to at least some embodiments. FIG. 1 shows an overhead view of the exterior of the camera. FIG. 2A shows a cross-sectional view of the camera across the A-A plane. FIG. 2B shows a cross-sectional view of the camera across the B-B plane.

FIGS. 3, 4A, and 4B illustrate components of an example camera with a reduced shoulder height and having an actuator module or assembly that may, for example, be used to provide autofocus through optics assembly movement and/or optical image stabilization through image sensor movement in small form factor cameras according to at least some embodiments. FIG. 3 shows an overhead view of the exterior of the camera. FIG. 4A shows a cross-sectional view of the camera across the C-C plane. FIG. 4B shows a cross-sectional view of the camera across the D-D plane.

FIG. 5A illustrates components of an example AF coil assembly including some embodiments of an AF damping structure, magnet holder, and lens carrier. FIG. 5B illustrates components of an example AF coil assembly including some embodiments of an AF damping structure, magnet holder, and lens carrier for reducing a height of a camera module.

FIG. 7A shows an overhead view of the example substrate architecture. FIG. 7B shows a cross-sectional view of the example substrate architecture and flexure architecture.

FIG. 8A shows an overhead view of the example substrate architecture. FIG. 8B shows a cross-sectional view of the example substrate architecture and flexure architecture.

FIG. 9A shows an overhead view of the example substrate architecture. FIG. 9B shows a cross-sectional view of the example substrate architecture and flexure architecture.

FIG. 10A shows an overhead view of the example substrate architecture. FIG. 10B shows a cross-sectional view of the example substrate architecture and flexure architecture.

FIGS. 12A and 12B illustrate components of an example vertical circuit board for a camera with a reduced shoulder height according to at least some embodiments. FIG. 12A shows a perspective view of an example vertical circuit board. FIG. 12B shows a perspective view of an example vertical circuit board including circuit board arms and position sensors.

FIG. 13 shows an exploded view of the camera including the vertical circuit board of FIG. 12A. FIG. 14 shows an exploded view of the camera including the vertical circuit board of FIG. 12B.

FIG. 15A shows components of an example substrate architecture including the vertical circuit board of FIG. 12A. FIG. 15B shows components of an example substrate architecture including the vertical circuit board of FIG. 12B.

FIG. 16A shows components of an example substrate architecture including the vertical circuit board of FIG. 12A. FIG. 16B shows components of an example substrate architecture including the vertical circuit board of FIG. 12B.

FIG. 17A shows components of an example substrate architecture including the vertical circuit board of FIG. 12A. FIG. 17B shows components of an example substrate architecture including the vertical circuit board of FIG. 12B.

FIG. 18A shows components of an example substrate architecture including the vertical circuit board of FIG. 12A. FIG. 18B shows components of an example substrate architecture including the vertical circuit board of FIG. 12B.

Figure 2A:
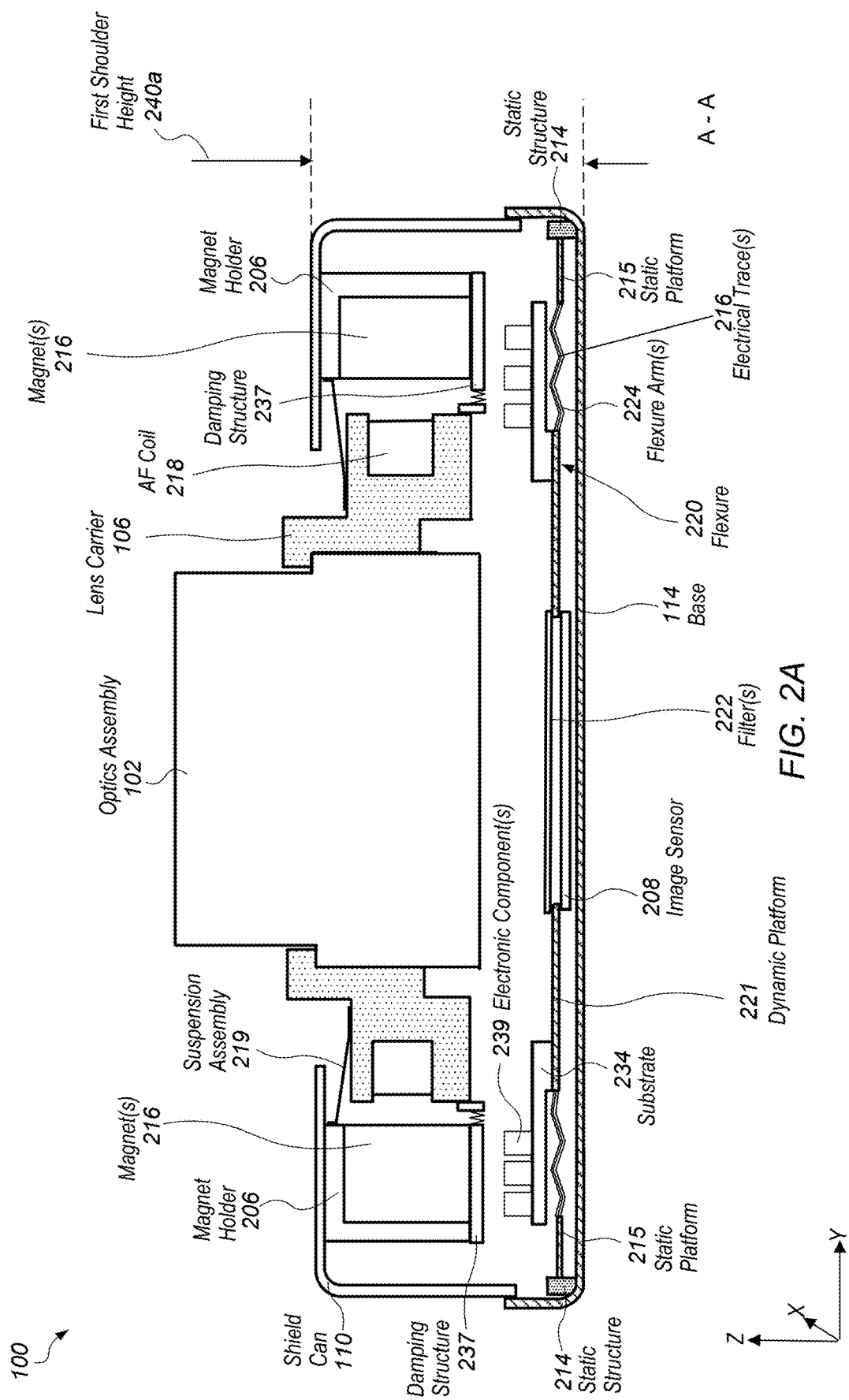

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a flexure module that may be used in a camera with a moveable image sensor. In some examples, the camera may include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF) and optical image stabilization (OIS). One approach to delivering a very compact actuator for OIS is to use a Voice Coil Motor (VCM) arrangement.

In some embodiments, the optical image stabilization actuator is designed such that the imagining sensor is mounted on an OIS frame which translates in X and Y (as opposed to an autofocus actuator that translates in Z, where Z is the optical axis of the camera). An electro-mechanical component for moving the image sensor is composed of a static and a dynamic platform. Mounting of an imaging sensor (wire bonding, flip/chip, BGA) on the dynamic platform with run out electrical signal traces from the dynamic platform to the static platform provides for connection to the image sensor. In-plane flexures connect the dynamic platform to the static platform and support electrical signal traces. OIS Coils are mounted on the dynamic platform. In some embodiments, OIS permanent magnets are mounted on the static platform to provide additional Lorentz force (e.g. in case of high in-plane flexure stiffness).

Some embodiments include a camera. The camera may include a lens, an image sensor, and a voice coil motor (VCM) actuator. The lens may include one or more lens elements that define an optical axis. The image sensor may be configured to capture light passing through the lens. Furthermore, the image sensor may be configured to convert the captured light into image signals.

In some embodiments, a camera actuator includes an actuator base, an autofocus voice coil motor, and an optical image stabilization voice coil motor. In some embodiments, the autofocus voice coil motor includes a lens carrier mounting attachment moveably mounted to the actuator base, a plurality of shared magnets mounted to the base, and an autofocus coil fixedly mounted to the lens carrier mounting attachment for producing forces for moving a lens carrier in a direction of an optical axis of one or more lenses of the lens carrier. In some embodiments, the optical image stabilization voice coil motor includes an image sensor carrier moveably mounted to the actuator base, and a plurality of optical image stabilization coils moveably mounted to the image sensor carrier within the magnetic fields of the shared magnets, for producing forces for moving the image sensor carrier in a plurality of directions orthogonal to the optical axis.

Some embodiments provide an actuator system using a first AF VCM (voice coil motor), and a second OIS VCM to separately accomplish sensor shift. In some embodiments, the AF VCM actuator allows translation of the optics along the optical axis. In some embodiments, the OIS VCM actuator allows an image sensor to translate in a plane perpendicular to optical axis. In some embodiments, the sensor is mounted on a flat flexure having electrical traces connecting an image sensor and I/O terminals.

In some embodiments, to improve camera performance and image quality, a size of the flexure module components may increase impacting a thickness (z-direction) of a camera module. As described herein, electronic components may be repositioned in the camera module to reduce thickness (e.g., a shoulder height) of the camera module. Additionally, or alternatively, the camera module may include a vertical circuit board for mounting one or more electronic components (e.g., a driver) and one or more high speed data links (HS-DLs) across the flexure arms of the flexure module for electronic communication between the electronic components on the vertical circuit board and one or more electronic components (e.g., the image sensor, position sensor) attached to a substrate (e.g., an OIS FPC, a printed circuit board, or the like). For example, a HS-DL may be provide electronic communication from an image sensor to a driver. Position sensors may be connected as analog output to the image sensor. Electronic components (e.g., low voltage drop-outs (LDOs), voltage regulators (e.g., capacitors), positions sensors, drivers, or the like) are moved ninety (90) degrees out of alignment with the AF damping structure providing z-direction space savings (e.g., about 100 μm). As another example, a HS-DL may provide electronic communication from an image sensor to a driver. Position sensors may be connected as analog output to the image sensor. Electronic components (e.g., low voltage drop-outs (LDOs), voltage regulators (e.g., capacitors), positions sensors, drivers, or the like) may be located at a lower layer (e.g., below a top layer) of the substrate (e.g., rather than on a top layer of the substrate). The top layer of the substrate may include an embedded coil and position sensor assembly may be surface mounted (SMT) on a bottom side of the top layer of the substrate, on a bottom side of the lower layer of the substrate, and/or in an cut out through the top layer of the substrate providing z-direction space savings (e.g., from about 200 μm to about 300 μm). As another example, a HS-DL may be provide electronic communication from an image sensor to a driver. Position sensors may be connected as analog output to the image sensor. Electronic components (e.g., low voltage drop-outs (LDOs), voltage regulators (e.g., capacitors), positions sensors, drivers, or the like) may be located on a dynamic platform of the flexure (e.g., rather than a top layer of the substrate). The top layer of the substrate may include an embedded coil and position sensor assembly may be surface mounted (SMT) on a bottom side of the top layer of the substrate, on a bottom side of the bottom block, and/or in a cut out through the top layer of the substrate providing z-direction space savings (e.g., as little as about 400 μm). In some aspects, the HS-DL may be used with remote sensing where the positions sensors include digital HS-DL out. The vertical circuit board having the various module implementations described herein may be used to reduce thickness (e.g., a shoulder height) of the camera module (and potentially in the x-y directions as well).

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 2B:
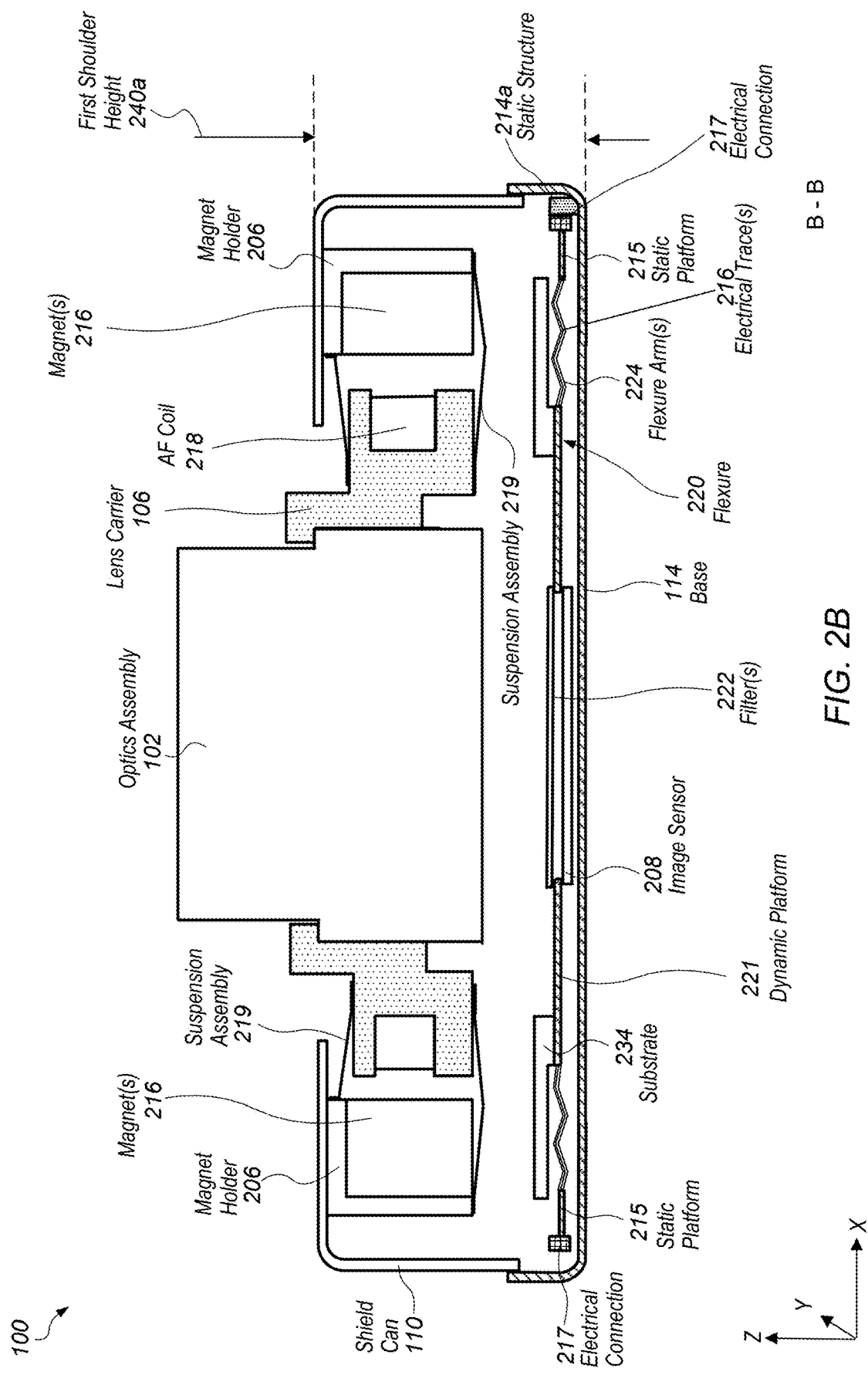

As mentioned above, various embodiments include a camera module with a flexure module or actuator module for moving an image sensor. FIGS. 1, 2A, and 2B illustrate components of an example camera 100 having an actuator module or assembly that may, for example, be used to provide autofocus through optics assembly movement and/or optical image stabilization through image sensor movement in small form factor cameras, according to at least some embodiments. FIG. 1 shows an overhead view of the exterior of the camera 100. FIG. 2A shows a cross-sectional view of the camera 100 across the A-A plane. FIG. 2B shows a cross-sectional view of the camera 100 across the B-B plane. The camera module 100 may include one or more same or similar features as the features described with respect to or illustrated in FIGS. 3, 4A, 4B, 5A, 5B, 6, 7A, 7B, 8A, 8B, 9A, 9B, 10A, 10B, 11, 12A, 12B, 13, 14, 15A, 15B, 16A, 16B, 17A, 17B, 18A, 18B, 19, 20, 21, 22, 23, and 24. The example X-Y-Z coordinate system shown in FIGS. 1, 2A, and 2B is used to discuss aspects of components and/or systems, and may apply to embodiments described throughout this disclosure.

In various embodiments, the camera 100 may include an optics assembly 102 having one or more lenses, a shield can 110, a magnet holder 206, magnet(s) 216, a lens carrier 106, an AF coil 218, a base 114, one or more OIS coils (e.g., OIS coils 622 illustrated in FIG. 6), a substrate 234 (e.g., an OIS FPC, printed circuit board, or the like), an image sensor 208, and an OIS frame or flexure 220. In some embodiments, the OIS frame or flexure 220 may be connected to a bottom surface of the base 114. In some examples, the base 114 may define one or more recesses and/or openings having multiple different cross-sections. For instance, a lower portion of the base 114 and/or an upper portion of the base 114 may define a recess and/or an opening with a cross-section sized to receive the OIS frame or flexure 220.

The shield can 110 may be mechanically attached to the base 114. The camera 100 may include an axial motion (AF) voice coil motor (VCM) (e.g., axial motion VCM) and/or a transverse motion (OIS) VCM. In some cases, the axial motion VCM may include the optics assembly 102, the magnet holder 206, the magnet 216, the lens carrier 106, and/or the AF coil 218. Furthermore, the transverse motion VCM may include the OIS coils (e.g., OIS coils 622 illustrated in FIG. 6), the substrate 234, the image sensor 208, the OIS frame or flexure 220 including the dynamic platform 221, the static platform 215, and the plurality of flexure arms 224 described herein. In some examples, the axial motion VCM (or a portion thereof) may be connected to the shield can 110, while the transverse motion VCM (or a portion thereof) may be connected to the base 114.

The flexure 220 may include a dynamic platform 221, a static platform 215, and a plurality of flexure arms 224. The plurality of flexure arms 224 may provide a flexible mechanical coupling between the static platform 215 and the dynamic platform 221 and allowing the dynamic platform 221 to move (e.g., using an OIS VCM) (e.g., in the x-y directions) relative to the static platform 215 (e.g., a remainder of the camera 100). In some aspects, the flexure arms 224 may include electrical traces 216 for communicating electrical power and electrical signals between the dynamic platform 221 (e.g., one or more electronic components (e.g., electronic components 239) mounted on the substrate 234, the image sensor 208 mounted on the substrate 234, one or more electronic components mounted to the dynamic platform 221, or the like) and the static platform 215. The electronic components may be for actuation of the dynamic platform 221 of the flexure relative to the static platform 215 of the flexure 220. As shown in FIG. 2A, the static platform 215 may be attached to the static structure 214 which is stationary with the camera 100. As shown in FIG. 2B, the static platform 215 may include electrical connections 217 for facilitating electrical communication between flexure platform 220 and one or more other electrical components of the camera 100 for performing one or more camera operations. In some aspects, the static platform 215 may be in electrical communication with one or more other components of the camera 110, via the electrical connection 217 and the static structure 214a have one or more electrical pathways between the electrical connection 217 and one or more other components of the camera 100, for performing one or more camera operations.

In some non-limiting examples, the image sensor 208 may be attached to or otherwise integrated into the substrate 234, such that the image sensor 208 is connected to the OIS frame or flexure 220 via the substrate 234. For example, the dynamic platform 221 may retain the substrate 234 for mounting one or more electronic components 239 and/or the image sensor 208. The substrate 234 may include an opening with a cross-section sized to permit light to pass therethrough while also receiving or retaining the filter(s) 222 and the image sensor 208. An upper surface of a top layer of the substrate 234 may retain the filter(s) 222 around a perimeter of the opening and a lower surface of a lower layer of the substrate 234 may retain the image sensor 208 around the perimeter of the opening. In some aspects, a ceramic layer beneath the lower layer of the substrate 234 may couple the image sensor 208 to the substrate 234. In some aspects, the lower layer of the substrate 234 may include a ceramic material that may couple the image sensor 208 to the substrate 234. With the lower surface of the lower layer of the substrate 234 retaining the image sensor 208 around the perimeter of the opening, the image sensor 208 may be connected (e.g., mechanically and/or electrically) to the flexure 220 via the substrate 234. This configuration may allow the substrate 234 to retain the image sensor 208 (and the filter(s) 222) while also allowing light to pass from the lens(es) of the optics assembly 102, through the filter(s) 222, and be received by the image sensor 208 for image capturing. In other embodiments, the substrate 234 and the image sensor 208 may be separately attached to the OIS frame or flexure 220. For instance, a first set of one or more electrical traces may be routed between the substrate 234 and the OIS frame or flexure 220. A second, different set of one or more electrical traces may be routed between the image sensor 208 and the OIS frame or flexure 220. In some aspects, an AF coil may be integrated or embedded within the substrate 234.

Figure 5B:
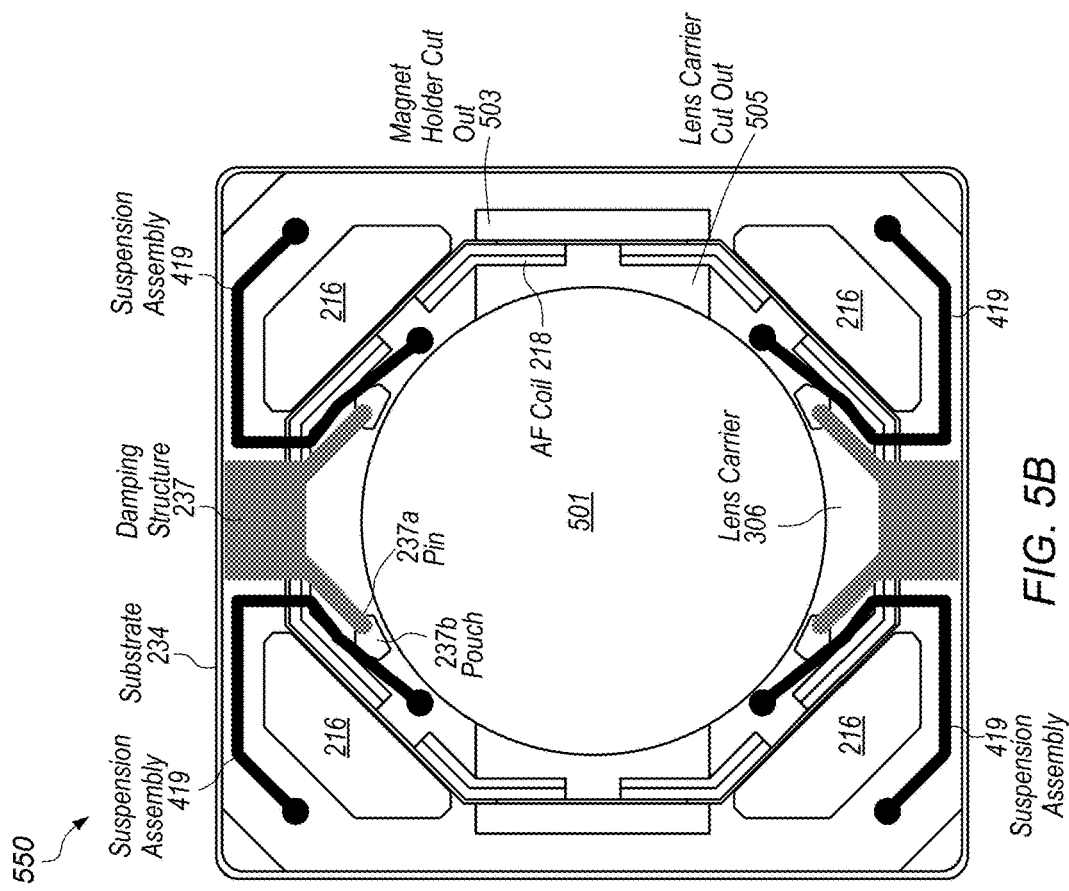
FIGS. 5A and 5B shows an overhead view of an AF coil assembly including AF damping structures, magnet holders, and lens carriers according to some embodiments.
Figure 5A:
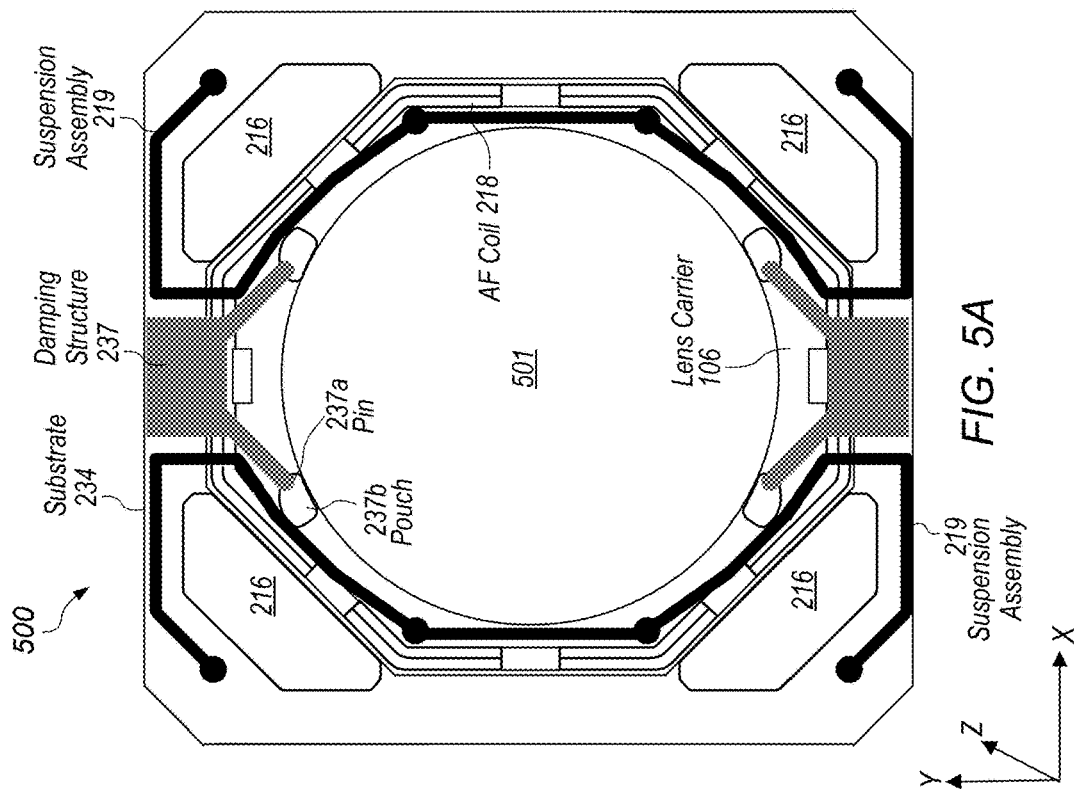

In addition, the camera 100 may also include an AF damping structure 237 (e.g., attached to the lens carrier 106, magnet holder 206), a suspension assembly 219, and one or more electronic components 239. The AF damping structure 237 may providing damping of movement of the optics assembly 102 in the z-direction. In some aspects, the AF damping structure 237 may include a pin 237a and a pouch 237b (e.g., a gel pouch) attached to the lens carrier 106 and configured to receive the pin 237a for dampening movement of the lens carrier 106. The suspension assembly 219 may retain the optics assembly 102 within a z-range of motion relative to the shield can 110. As shown in FIG. 5A and described further herein, the suspension assembly 219 may include a configuration that is not vertically aligned with the AF damping structure 237, but is vertically aligned with the spaces above the substrate 234 that are approximately ninety (90) degrees out of alignment with the AF damping structure 237. The electronic components 239 may be positioned (e.g., surface mounted (SMT)) on a top surface of the substrate 234 and may be in vertical alignment with the AF damping structure 237. The electronic components 239 may include low voltage drop-outs (LDOs), voltage regulators (e.g., capacitors), positions sensors, drivers, and/or the like. In some aspects, the electronic components 239 (e.g., voltage regulators) may provide a power supply for the image sensor 208 and other drivers (e.g., driver circuits). As shown in FIG. 2A, the one or more electronic components 239 occupy space in the z-direction so that the vertical alignment of at least the AF damping structure 237 and the electronic components 239 attached to the top surface of the substrate 234 may create a first shoulder height 240a for the camera module. As shown in FIG. 2B, the space above the substrate 234 is out of vertical alignment (e.g., ninety (90) degrees out of vertical alignment) with the AF damping structure 237 and provides an open volume due to the first shoulder height 240a.

Figure 4A:
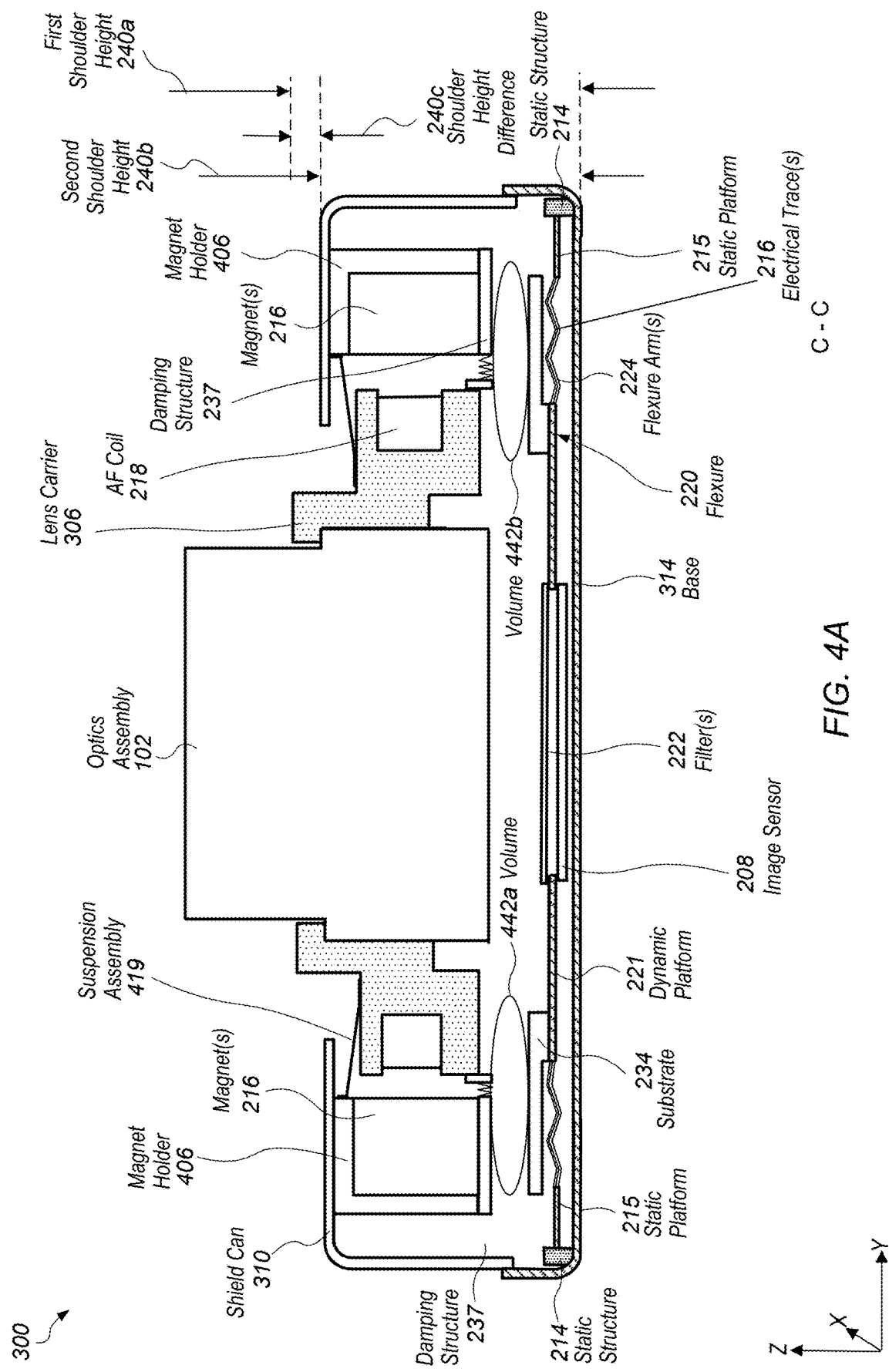
Figure 4B:
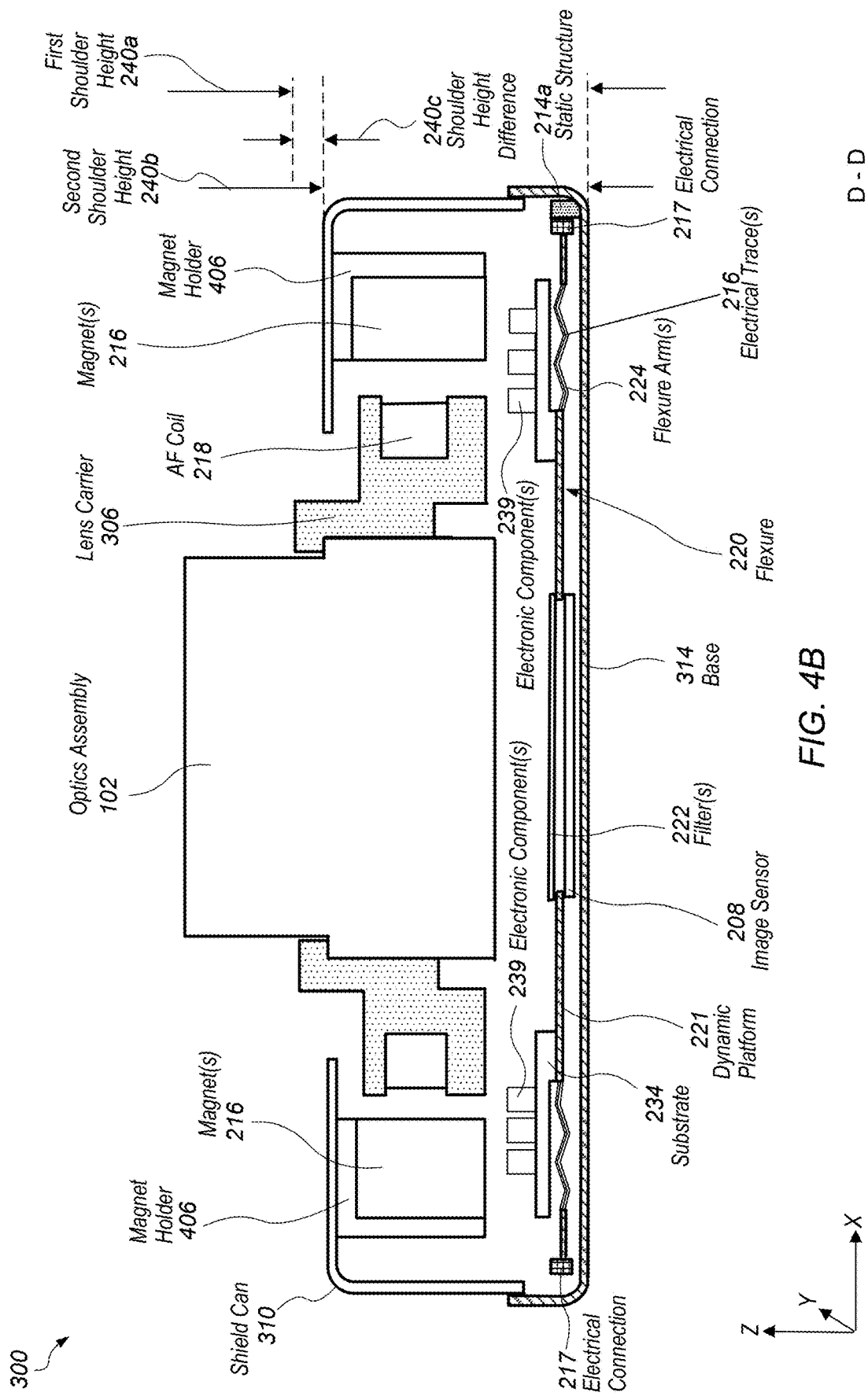

In some aspects, various embodiments include a camera module with a flexure module or actuator module for moving an image sensor. FIGS. 3, 4A, and 4B illustrate components of an example camera 300 having an actuator module or assembly that may, for example, be used to provide autofocus through optics assembly movement and/or optical image stabilization through image sensor movement in small form factor cameras, according to at least some embodiments. FIG. 3 shows an overhead view of the exterior of the camera 300. FIG. 4A shows a cross-sectional view of the camera 300 across the C-C plane. FIG. 4B shows a cross-sectional view of the camera 300 across the D-D plane. The camera 300 may include one or more same or similar features as the features described with respect to or illustrated in FIGS. 1, 2A, 2B, 5A, 5B, 6, 7A, 7B, 8A, 8B, 9A, 9B, 10A, 10B, 11, 12A, 12B, 13, 14, 15A, 15B, 16A, 16B, 17A, 17B, 18A, 18B, 19, 20, 21, 22, 23, and 24. The example X-Y-Z coordinate system shown in FIGS. 3, 4A, and 4B is used to discuss aspects of components and/or systems, and may apply to embodiments described throughout this disclosure.

In various embodiments, the camera 300 may include the optics assembly 102 having one or more lenses, a shield can 310, a magnet holder 406, magnet(s) 216, a lens carrier 306, an AF coil 218, a base 314, one or more OIS coils (e.g., OIS coils 622 illustrated in FIG. 6), a substrate 234 (e.g., an OIS FPC, printed circuit board, or the like), the image sensor 208, and the OIS frame or flexure 220. In some embodiments, the OIS frame or flexure 220 may be connected to a bottom surface of the base 314. In some examples, the base 314 may define one or more recesses and/or openings having multiple different cross-sections. For instance, a lower portion of the base 314 and/or an upper portion of the base 314 may define a recess and/or an opening with a cross-section sized to receive the OIS frame or flexure 220. In some aspects, as described further herein with respect to FIG. 5B, the magnet holder 406 may include a magnet holder cut out positioned above the substrate 234 and covering an area that is approximately ninety (90) degrees out of vertical alignment with the AF damping structure 237. This configuration may provide additional z-direction space above the substrate 234 and approximately ninety (90) degrees out of alignment with the AF damping structure 237 for reducing the shoulder height of the camera module 300. Additionally, or alternatively, as described further herein with respect to FIG. 5B, the lens carrier 306 may include a lens carrier cut out positioned above the substrate 234 and covering an area that is approximately ninety (90) degrees out of vertical alignment with the AF damping structure 237. This configuration may provide additional z-direction space above the substrate 234 and approximately ninety (90) degrees out of alignment with the AF damping structure 237 for reducing the shoulder height of the camera module 300.

The shield can 310 may be mechanically attached to the base 314. The camera 300 may include an axial motion (AF) voice coil motor (VCM) (e.g., axial motion VCM) and/or a transverse motion (OIS) VCM. In some cases, the axial motion VCM may include the optics assembly 102, the magnet holder 406, the magnet 216, the lens carrier 306, and/or the AF coil 218. Furthermore, the transverse motion VCM may include the OIS coils (e.g., OIS coils 622 illustrated in FIG. 6), the substrate 234, the image sensor 208, the OIS frame or flexure 220 including the dynamic platform 221, the static platform 215, and the plurality of flexure arms 224 described herein. In some examples, the axial motion VCM (or a portion thereof) may be connected to the shield can 310, while the transverse motion VCM (or a portion thereof) may be connected to the base 314.

In addition, the camera 300 may include the AF damping structure 237, a suspension assembly 419, and the one or more electronic components 239. The AF damping structure 237 may providing damping of movement of the optics assembly 102 in the z-direction. The suspension assembly 419 may retain the optics assembly 102 within a z-range of motion relative to the shield can 310. As shown in FIG. 5B and described further herein, the suspension assembly 419 may include a configuration that is not vertically aligned with the AF damping structure 237 and is also not vertically aligned with the spaces above the substrate 234 that are approximately ninety (90) degrees out of alignment with the AF damping structure 237. This feature may provide additional shoulder height savings for the camera module 300 compared to the camera module 100. As shown in FIG. 4A, volumes 442a and 442b may be vertically aligned with the AF damping structure 237 and may include at least a portion of the AF damping structure 237, at least a portion of the substrate 234, and/or an area between the AF damping structure 237 and the substrate 234. As at least a part of a configuration for the camera 300 to have a reduced shoulder height, the electronic components 239 may not have an attachment position within the volumes 442a and 442b. In some aspects, as at least a part of a configuration for the camera 300 to have the second shoulder height 240b (e.g., a reduced shoulder height), the electronic components 239 may not be located within the volumes 442a and 442b. Instead, the electronic components 239 be positioned (e.g., have an attachment position, have a location) outside the volumes 442a and/or 442b where more vertical spaces are present. In some aspects, particular electronic components may be positioned outside the volumes 442a and/or 442b while other electronic components may be positioned within the volumes 442a and/or 442b. For example, more active electronic components such as drivers and voltage regulators may be positioned outside the volumes 442a and/or 442b while more passive electronic components such as resistors and capacitors may be positioned within the volumes 442a and/or 442b. In some cases, electronic components that are greater than a threshold height may be positioned outside the volumes 442a and/or 442b while other electronic components that are less than or equal to a threshold height may be positioned within the volumes 442a and/or 442b. By restricting the electronic components 237 (e.g., at least some electronic components 237) from being with the volumes 442a and/or 442b, a shoulder height of the camera 300 may be reduced from the first shoulder height 240a to the second shoulder height 240b by a shoulder height difference 240c.

For example, as shown in FIG. 4B, the electronic components 239 may have an attachment position (e.g., surface mounted (SMT)) and/or may be located outside of the volumes 442a and/or 442b and may be ninety (90) degrees out of vertical alignment with the AF damping structure 237. The position of the electronic components 237 at the space above the substrate 234 and outside the volumes 442a and/or 442b may provide a shoulder height of the camera 300 that is reduced from the first shoulder height 240a to the second shoulder height 240b by a shoulder height difference 240c.

FIGS. 5A and 5B show an overhead view of an AF coil assembly including AF damping structures, magnet holders, and lens carriers according to some embodiments. The features illustrated and described with respect to FIGS. 5A and 5B may include one or more same or similar features as the features described with respect to or illustrated in FIGS. 1, 2A, 2B, 3, 4A, 4B, 6, 7A, 7B, 8A, 8B, 9A, 9B, 10A, 10B, 11, 12A, 12B, 13, 14, 15A, 15B, 16A, 16B, 17A, 17B, 18A, 18B, 19, 20, 21, 22, 23, and 24. With respect to FIG. 5A, the example AF coil assembly may include the AF coil 218, an optics assembly 501, the lens carrier 106, the AF damping structure 237, and the suspension assembly 219. The AF coil assembly may be position above or over the substrate 234 and adjacent (e.g., next to) the magnets 216. In some aspects, the AF damping structure 237 may include a pin 237a and a pouch 237b (e.g., a gel pouch) attached to the lens carrier 106 and configured to receive the pin 237a for dampening movement of the lens carrier 106. As shown in FIG. 5A, the suspension assembly 219 includes two sections at the same vertical elevation such that sections extend over an area that is approximately ninety (90) degrees out of vertical alignment with the damping structure 237. This configuration may limit a height of the electronic components 239 that may be positioned on the substrate 234 approximately ninety (90) degrees out of vertical alignment with the damping structure 237. In some aspects, one or more components of the AF coil assembly illustrated in FIG. 5A may be used with the camera 100 illustrated in FIGS. 1, 2A, and 2B.

With respect to FIG. 5B, the example AF coil assembly may include the AF coil 218, an optics assembly 501, the lens carrier 306, the AF damping structure 237, and the suspension assembly 419. The AF coil assembly may be position above or over the substrate 234 and adjacent (e.g., next to) the magnets 216. In some aspects, the AF damping structure 237 may include a pin 237a and a pouch 237b (e.g., a gel pouch) attached to the lens carrier 106 and configured to receive the pin 237a for dampening movement of the lens carrier 106. As shown in FIG. 5B, the suspension assembly 419 includes four sections at the same vertical elevation such that the sections do not extend over an area that is approximately ninety (90) degrees out of vertical alignment with the damping structure 237. This configuration may provide additional height for the electronic components 239 to be positioned on the substrate 234 approximately ninety (90) degrees out of vertical alignment with the damping structure 237. Further, the lens carrier 306 may include a lens carrier cutout 505 that extends over an area that is approximately ninety (90) degrees out of vertical alignment with the damping structure 237. The lens carrier cutout 505 may provide additional height for the electronic components 239 to be positioned on the substrate 234 approximately ninety (90) degrees out of vertical alignment with the damping structure 237. Additionally, or alternatively, the magnet holder (e.g., magnet holder 406 illustrated in FIGS. 4A and 4B) may include a magnet holder cut out 503 that extends over an area that is approximately ninety (90) degrees out of vertical alignment with the damping structure 237. The magnet holder cutout 503 may provide additional height for the electronic components 239 to be positioned on the substrate 234 approximately ninety (90) degrees out of vertical alignment with the damping structure 237. In some aspects, one or more components of the AF coil assembly illustrated in FIG. 5B may be used with the camera 300 illustrated in FIGS. 3, 4A, and 4B.

Figure 6:
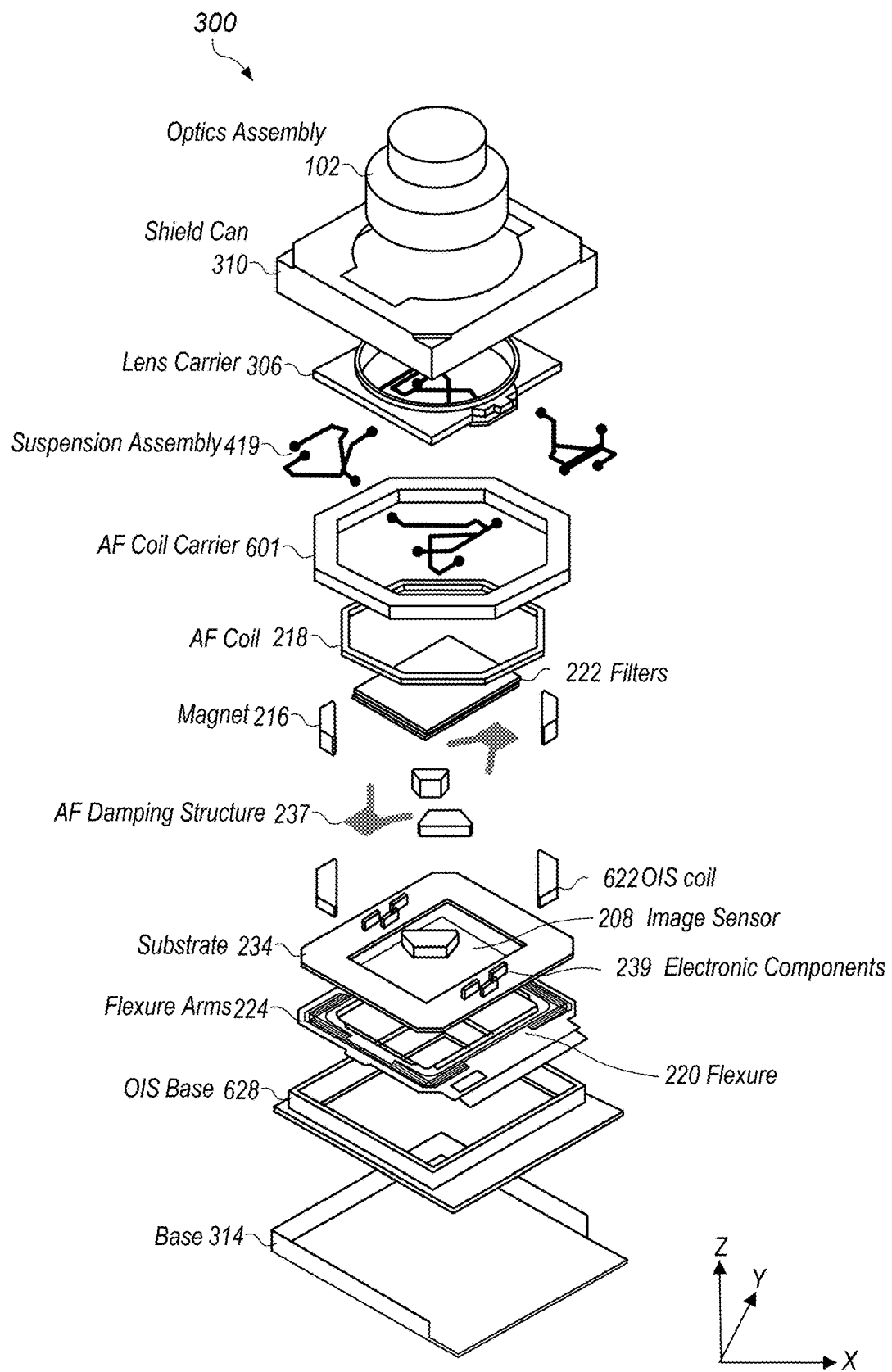
FIG. 6 illustrates an exploded view of an example camera having an actuator module or assembly that may, for example, be used to provide autofocus through optics assembly movement and/or optical image stabilization through image sensor movement in small form factor cameras according to at least some embodiments.

FIG. 6 illustrates an exploded view of the camera 300 having an actuator module or assembly that may, for example, be used to provide autofocus through optics assembly movement and/or optical image stabilization through image sensor movement in small form factor cameras according to at least some embodiments. The camera 300 may include one or more same or similar features as the features described with respect to or illustrated in FIGS. 1, 2A, 2B, 5A, 5B, 7A, 7B, 8A, 8B, 9A, 9B, 10A, 10B, 11, 12A, 12B, 13, 14, 15A, 15B, 16A, 16B, 17A, 17B, 18A, 18B, 19, 20, 21, 22, 23, and 24. In various embodiments, the camera 300 may include an optics assembly 102, a shield can 310, a lens carrier 306, the suspension assembly 419, the magnets 216, the magnet holder 206, the AF coil 218, the AF coil carrier 601, the filer(s) 222, the image sensor 208, the AF damping structure 237, the electronic components 239, the OIS coils 622, the substrate 234, the flexure 220, an OIS base 628, and the base 314.

In various examples, the shield can 310 may be mechanically attached to the base 314. The camera 300 may include an axial motion (AF) voice coil motor (VCM) and/or a transverse motion (OIS) VCM. In some cases, the axial motion VCM may include the optics assembly 102, the magnet holder 206, the magnets 216, the lens carrier 306, and/or the AF coil 218. Furthermore, the transverse motion VCM may include the OIS coils 622, the substrate 234, the flexure 220, the OIS base 628, and the image sensor 208. In some examples, the axial motion VCM (or a portion thereof) may be connected to the shield can 310, while the transverse motion VCM (or a portion thereof) may be connected to the base 314.

In some embodiments, the OIS base 628 may be connected to a bottom surface of the base 314. In some examples, the base 314 may define one or more recesses and/or openings having multiple different cross-sections. For instance, a lower portion of the base 314 may have may define a recess and/or an opening with a cross-section sized to receive an OIS frame. An upper portion of the base 314 may define a recess and/or an opening with a cross-section sized to receive the flexure 220. The upper portion may have an inner profile corresponding to the outer profile of the flexure 220. This may help to maximize the amount of material included in the base 314 (e.g., for providing structural rigidity to the base 314) while still providing at least a minimum spacing between the flexure 220 and the base 314.

In some non-limiting examples, the flexure 220 and the image sensor 208 may be separately attached to the OIS base 628. For instance, a first set of one or more electrical traces of the electrical traces may be routed between the flexure 220 and the OIS base 628. A second, different set of one or more electrical traces of the electrical trace may be routed between the image sensor 208 and the OIS base 628. In other embodiments, the image sensor 208 may be attached to or otherwise integrated into the flexure 220, such that the image sensor 208 is connected to the OIS frame via the flexure 220.

Figure 7A:
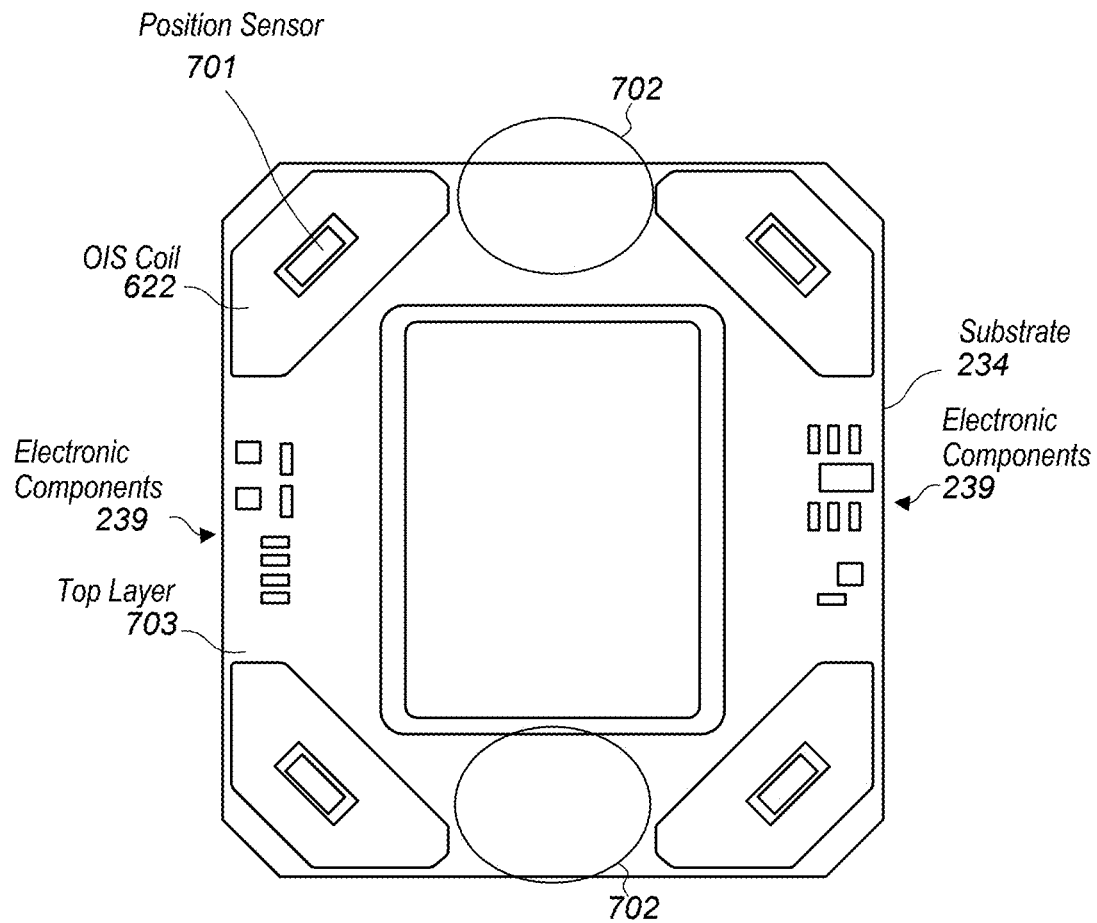
FIGS. 7A and 7B illustrate components of an example substrate architecture and flexure architecture according to at least some embodiments.
Figure 7B:
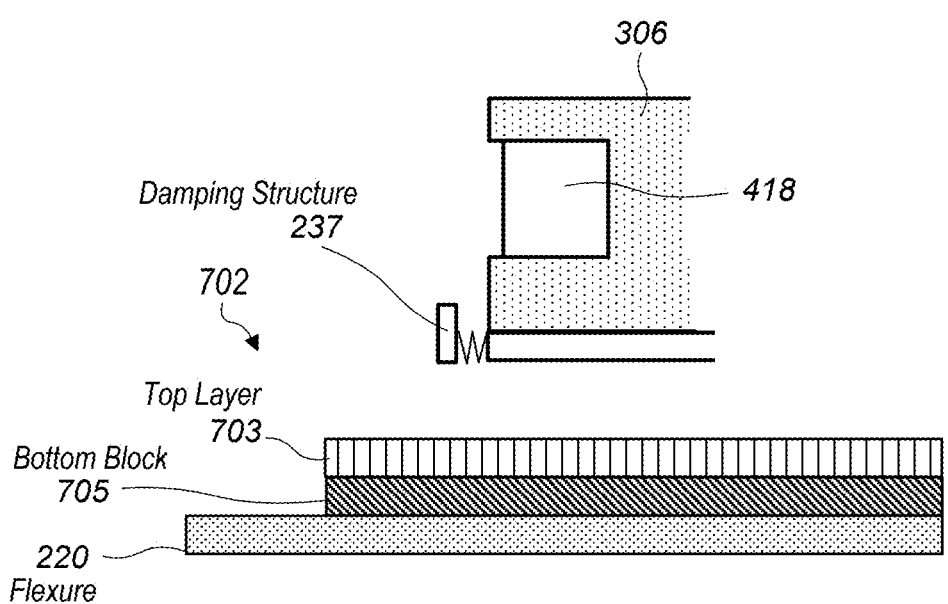

FIGS. 7A and 7B illustrate components of an example substrate architecture and flexure architecture according to at least some embodiments. FIG. 7A shows an overhead view of the example substrate architecture. FIG. 7B shows a cross-sectional view of the example substrate architecture and flexure architecture. The components illustrated in FIGS. 7A and 7B may include one or more same or similar features as the features described with respect to or illustrated in FIGS. 1, 2A, 2B, 5A, 5B, 6, 8A, 8B, 9A, 9B, 10A, 10B, 11, 12A, 12B, 13, 14, 15A, 15B, 16A, 16B, 17A, 17B, 18A, 18B, 19, 20, 21, 22, 23, and 24.

As shown in FIG. 7A, the substrate 234 may include electronic components 239 SMT to a top surface (e.g., exposed to an area including the damping structure 237) of the top layer 703 (e.g., of a substrate 234), and an area 702 indicating a vertical location of the damping structure 237. The substrate 234 may also include OIS coils 622 and position sensors 701. The position sensors 701 may be connected as analog output to the image sensor as described herein. The position sensors 701 may also be used for remote sensing as described herein. The electronic components 239 may be in a location that is about ninety (90) degrees out of alignment with area 702 (e.g., where the AF damping structure 237 may be located) providing z-direction space savings as shown in FIG. 7B (e.g., about 100 µm). As shown in FIG. 7B, the area 702 includes the damping structure 237, the top layer 703 of the substrate 234, the bottom block 705 (e.g., a ceramic connection to the image sensor 208), and the flexure 220. Because the area 702 does not include the electronic components 239, a small amount of z-direction space may be used to accommodate the damping structure 237, the top layer 703 of the substrate 234, the bottom block 705, and the flexure 220.

Figure 8A:
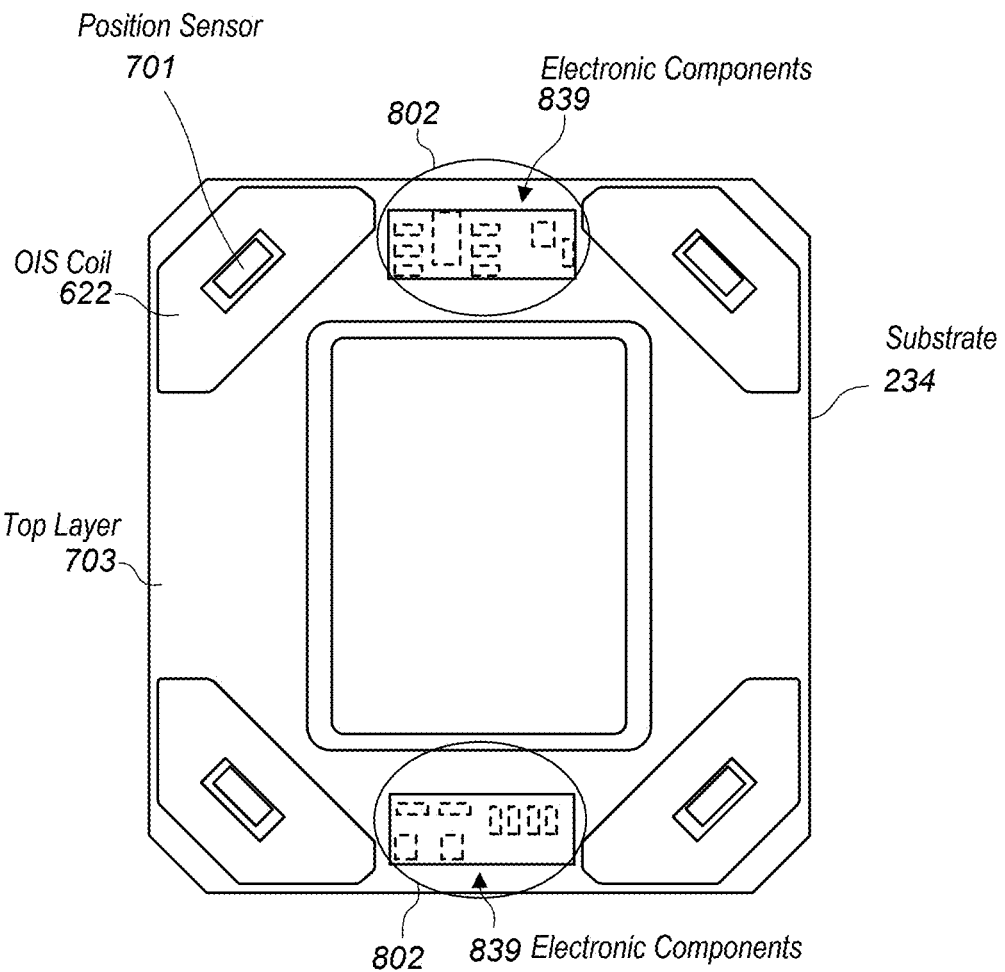
FIGS. 8A and 8B illustrate components of an example substrate architecture and flexure architecture according to at least some embodiments.
Figure 8B:
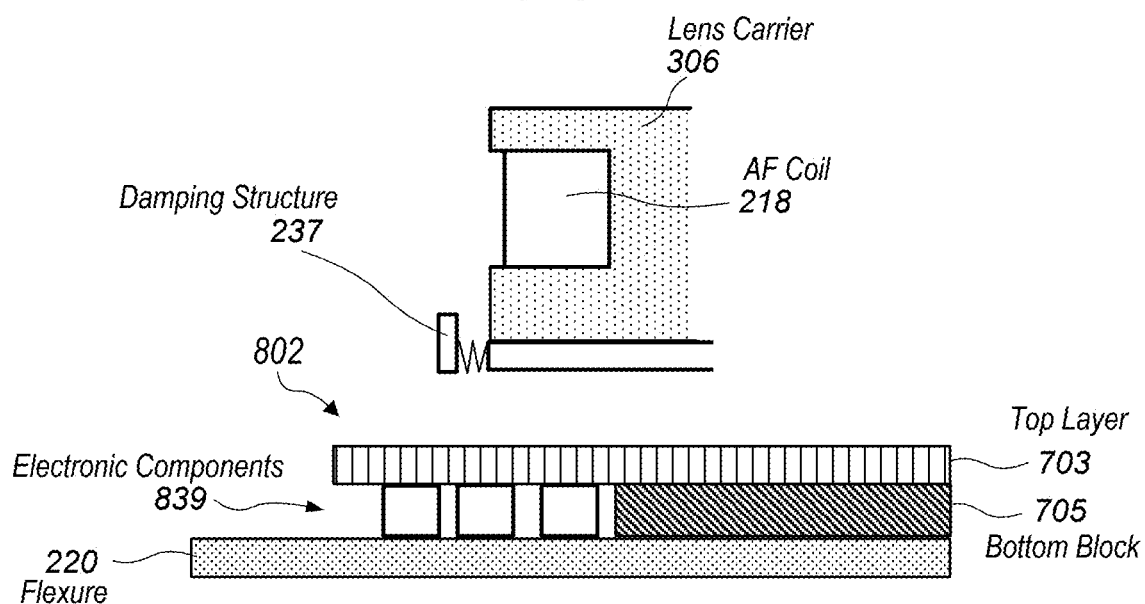

FIGS. 8A and 8B illustrate components of an example substrate architecture and flexure architecture according to at least some embodiments. FIG. 8A shows an overhead view of the example substrate architecture. FIG. 8B shows a cross-sectional view of the example substrate architecture and flexure architecture. The components illustrated in FIGS. 8A and 8B may include one or more same or similar features as the features described with respect to or illustrated in FIGS. 1, 2A, 2B, 5A, 5B, 6, 7A, 7B, 9A, 9B, 10A, 10B, 11, 12A, 12B, 13, 14, 15A, 15B, 16A, 16B, 17A, 17B, 18A, 18B, 19, 20, 21, 22, 23, and 24.

As shown in FIGS. 8A and 8B, the substrate 234 may include electronic components 839 (e.g., which may include one or more same or similar features as the electronic components 239). The electronic components 839 may be in a location that is approximately in alignment with area 802 (e.g., where the AF damping structure 237 may be located). The electronic components 839 may be located adjacent a bottom block 705 and SMT against a surface of the top layer 703 of the substrate 234 (e.g., a bottom side of the top layer 703) opposite the damping structure 237 (e.g., rather than a top side of top layer 703 of the substrate 234). In some aspects, the substrate 234 may include one or more embedded OIS coils 622 and position sensors 701 surface mounted (SMT) on a bottom side of the top layer 703 of the substrate 234, on a bottom side of the bottom block 705, and/or in an cutout through the top layer 703 of the substrate 234. The position sensors 701 may be connected as analog output to the image sensor as described herein. The position sensors 701 may also be used for remote sensing as described herein.

The electronic components 839 may be in a location that is approximately in alignment with area 802 (e.g., where the AF damping structure 237 may be located). The electronic components 839 may be providing z-direction space savings as shown in FIG. 8B. As shown in FIG. 8B, the area 802 includes the damping structure 237, the top layer 703 of the substrate 234, the electronic components 839 adjacent the bottom block 705 and SMT to a bottom surface of the top layer 703, and the flexure 220. Because the electronic components 839 are adjacent the bottom block 705 and SMT to a bottom surface of the top layer 703, a small amount of z-direction space may be used to accommodate the damping structure 237, the top layer 703 of the substrate 234, the bottom block 705, the electronic components 839, and the flexure 220 providing z-direction space savings (e.g., from about 200 μm to about 300 μm).

Figure 9A:
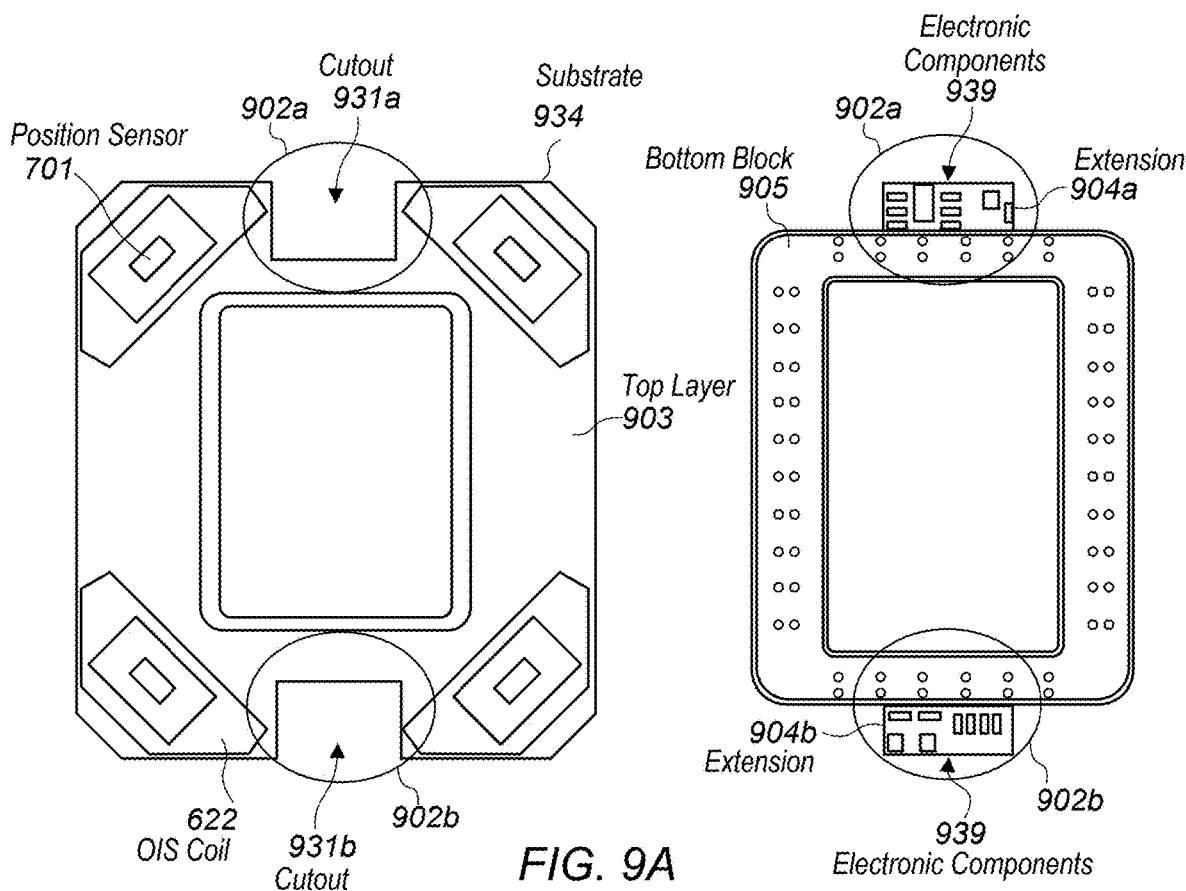
FIGS. 9A and 9B illustrate components of an example substrate architecture and flexure architecture according to at least some embodiments.
Figure 9B:
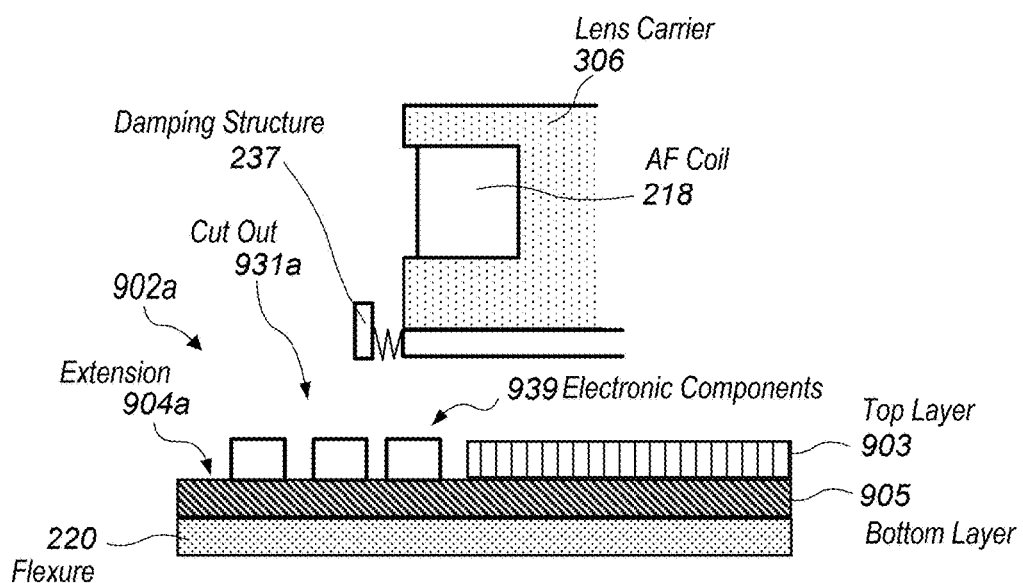

FIGS. 9A and 9B illustrate components of an example substrate architecture and flexure architecture according to at least some embodiments. FIG. 9A shows an overhead view of the example substrate architecture. FIG. 9B shows a cross-sectional view of the example substrate architecture and flexure architecture. The components illustrated in FIGS. 9A and 9B may include one or more same or similar features as the features described with respect to or illustrated in FIGS. 1, 2A, 2B, 5A, 5B, 6, 7A, 7B, 8A, 8B, 10A, 10B, 11, 12A, 12B, 13, 14, 15A, 15B, 16A, 16B, 17A, 17B, 18A, 18B, 19, 20, 21, 22, 23, and 24.

As shown in FIGS. 9A and 9B, a substrate 934 (which may include one or more same or similar features as the substrate 234) may include a top layer 903 and a bottom block 905. The top layer 903 may include a cutout 931a and a cutout 931b extending through the top layer 903 and aligned with an area 902a and 902b, respectively (e.g., where the AF damping structure 237 may be located). The bottom block 905 may include an extension 904a and an extension 904b that are also approximately aligned with the areas 902a and 902b. Electronic components 939 (e.g., which may include one or more same or similar features as the electronic components 239 and/or the electronic components 839) may be SMT to the extensions 904a and 904b. As shown in FIG. 7B, the electronic component 939 SMT on the extensions 904a and 904b extend in the z-direction at least partially through the respective cutout 931a and 931b. Because the electronic components 939 are adjacent the top layer 903 of the substrate 934 and SMT to the extensions 904a and 904b while extending at least partially through the cutouts 931a and 931b, a small amount of z-direction space may be used to accommodate the damping structure 237, the top layer 903 of the substrate 934, the bottom block 905, the electronic components 939, and the flexure 220 providing z-direction space savings (e.g., from about 200 μm to about 300 μm). In some aspects, the substrate 934 may include an embedded OIS coils 622 and position sensors 701 surface mounted (SMT) on a bottom side of the top layer 903 of the substrate 934, on a bottom side of the bottom block 905 of the substrate 934, and/or in a cutout 931a and 931b through the top layer 903 of the substrate 934. The position sensors 701 may be connected as analog output to the image sensor as described herein. The position sensors 701 may also be used for remote sensing as described herein.

Figure 10A:
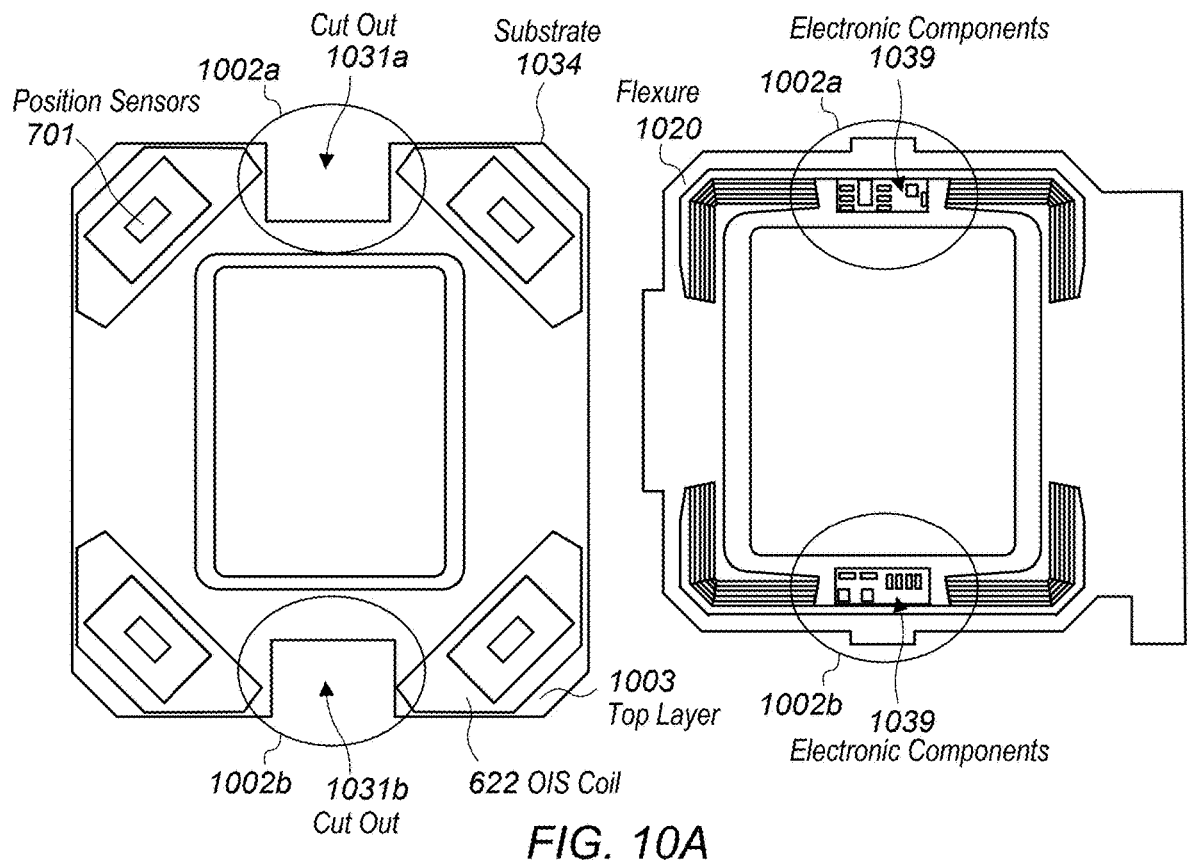
FIGS. 10A and 10B illustrate components of an example substrate architecture and flexure architecture according to at least some embodiments.
Figure 10B:
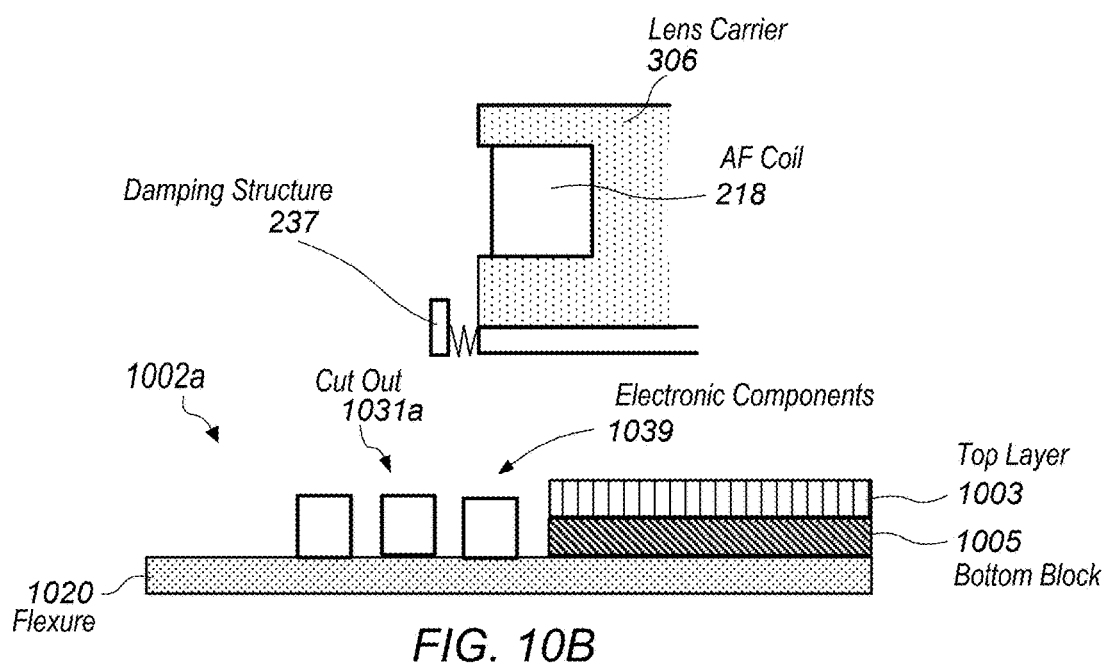

FIGS. 10A and 10B illustrate components of an example substrate architecture and flexure architecture according to at least some embodiments. FIG. 10A shows an overhead view of the example substrate architecture. FIG. 10B shows a cross-sectional view of the example substrate architecture and flexure architecture. The components illustrated in FIGS. 10A and 10B may include one or more same or similar features as the features described with respect to or illustrated in FIGS. 1, 2A, 2B, 5A, 5B, 6, 7A, 7B, 8A, 8B, 9A, 9B, 11, 12A, 12B, 13, 14, 15A, 15B, 16A, 16B, 17A, 17B, 18A, 18B, 19, 20, 21, 22, 23, and 24.

As shown in FIGS. 10A and 10B, the substrate 1034 may include the top layer 1003 and the bottom block 1005. The substrate 1034 may include the cutouts 1031a and 1031b extending through the top layer 1003 and the bottom block 1005 and aligned with an areas 1002a and 1002b (e.g., where the AF damping structure 237 may be located). A flexure 1020 (e.g., including one or more same or similar features as the flexure 220) may include electronic components 1039 (e.g., which may include one or more same or similar features as the electronic components 239, the electronic components 839, and/or the electronic components 939) SMT to the flexure 1020 (e.g., to the dynamic platform or portion (e.g., dynamic platform 221) of the flexure 1020. As shown in FIG. 10B, the electronic components 1039 SMT on the flexure 1020 extend in the z-direction at least partially through the cutouts 1031a and 1031b. Because the electronic components 1039 are adjacent the top layer 1003 of the substrate 1034 and the bottom block 1005 while extending at least partially through the cutouts 1031a and 1031b, a small amount of z-direction space may be used to accommodate the damping structure 237, the top layer 1003 of the substrate 1034, the bottom block 1005 of the substrate 1034, the electronic components 1039, and the flexure 1020 providing z-direction space savings (e.g., as little as about 400 μm). In some aspects, the substrate 1034 may include an embedded OIS coils 622 and position sensors 701 surface mounted (SMT) on a bottom side of the top layer 1003 of the substrate 1034, on a bottom side of the bottom block 1005 of the substrate 1034, and/or in the cutouts 1031a and 1031b through the top layer 1003 and the bottom layer 1005 of the substrate 1034. The position sensors 701 may be connected as analog output to the image sensor as described herein. The position sensors 701 may also be used for remote sensing as described herein. In some aspects, the HS-DL may be used with remote sensing where the positions sensors include digital HS-DL out.

Figure 11:
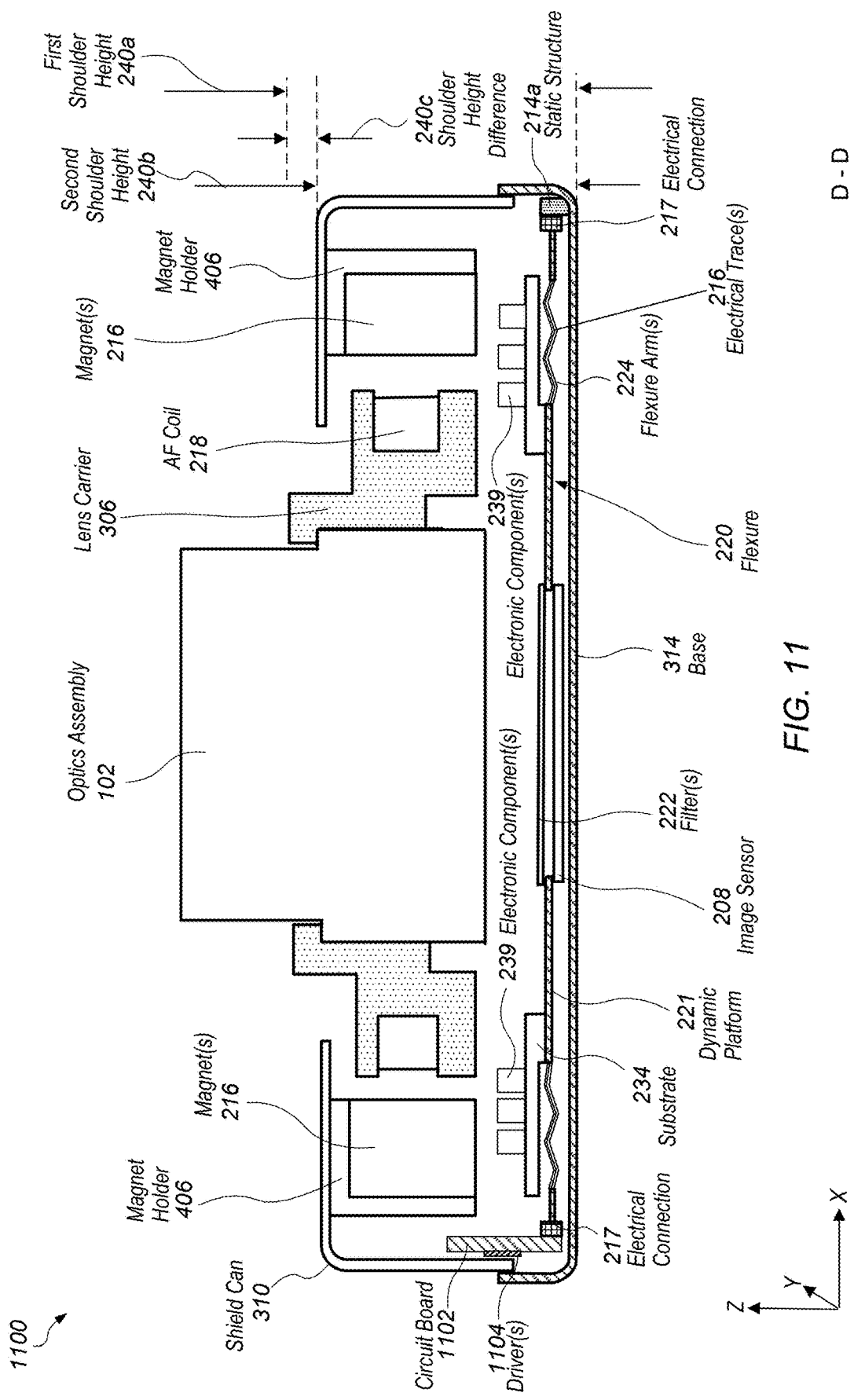
FIG. 11 illustrates a cross-sectional view of components of an example camera with a reduced shoulder height and having a vertical circuit board with a mounted driver and an actuator module or assembly that may, for example, be used to provide autofocus through optics assembly movement and/or optical image stabilization through image sensor movement in small form factor cameras according to at least some embodiments.

FIG. 11 illustrates a cross-sectional view of components of an example camera 1100 with a reduced shoulder height and having a vertical circuit board with a mounted driver and an actuator module or assembly that may, for example, be used to provide autofocus through optics assembly movement and/or optical image stabilization through image sensor movement in small form factor cameras according to at least some embodiments. FIG. 11 shows a cross-sectional view of the camera 1100. In some aspects, the cross-section view of the camera 1100 may be the same or at least similar to the cross section of the camera 300 across the D-D plane illustrated in FIG. 3. The camera 1100 may include one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 12A, 12B, 13, 14, 15A, 15B, 16A, 16B, 17A, 17B, 18A, 18B, 19, 20, 21, 22, 23, and 24. The example X-Y-Z coordinate system shown in FIG. 11 is used to discuss aspects of components and/or systems, and may apply to embodiments described throughout this disclosure.

In various embodiments, the camera 1100 may include the optics assembly 102 having one or more lenses, the shield can 310, the magnet holder 406, magnet(s) 216, the lens carrier 306, the AF coil 218, the base 314, one or more OIS coils (e.g., OIS coils 622 illustrated in FIG. 6), the substrate 234 (e.g., an OIS FPC, printed circuit board, or the like), the image sensor 208, and the OIS frame or flexure 220. In some embodiments, the OIS frame or flexure 220 may be connected to a bottom surface of the base 314. In some examples, the base 314 may define one or more recesses and/or openings having multiple different cross-sections. For instance, a lower portion of the base 314 and/or an upper portion of the base 314 may define a recess and/or an opening with a cross-section sized to receive the OIS frame or flexure 220. In some aspects, as described herein with respect to FIG. 5B, the magnet holder 406 may include a magnet holder cut out positioned above the substrate 234 and covering an area that is approximately ninety (90) degrees out of vertical alignment with the AF damping structure 237. This configuration may provide additional z-direction space above the substrate 234 and approximately ninety (90) degrees out of alignment with the AF damping structure 237 for reducing the shoulder height of the camera module 300. Additionally, or alternatively, as described herein with respect to FIG. 5B, the lens carrier 306 may include a lens carrier cut out positioned above the substrate 234 and covering an area that is approximately ninety (90) degrees out of vertical alignment with the AF damping structure 237. This configuration may provide additional z-direction space above the substrate 234 and approximately ninety (90) degrees out of alignment with the AF damping structure 237 for reducing the shoulder height of the camera module 300.

The shield can 310 may be mechanically attached to the base 314. The camera 300 may include an axial motion (AF) voice coil motor (VCM) (e.g., axial motion VCM) and/or a transverse motion (OIS) VCM. In some cases, the axial motion VCM may include the optics assembly 102, the magnet holder 406, the magnet 216, the lens carrier 306, and/or the AF coil 218. Furthermore, the transverse motion VCM may include the OIS coils (e.g., OIS coils 622 illustrated in FIG. 6), the substrate 234, the image sensor 208, the OIS frame or flexure 220 including the dynamic platform 221, the static platform 215, and the plurality of flexure arms 224 described herein. In some examples, the axial motion VCM (or a portion thereof) may be connected to the shield can 310, while the transverse motion VCM (or a portion thereof) may be connected to the base 314.

In some aspects, the camera 1100 may include the AF damping structure 237, the suspension assembly 419, and the one or more electronic components 239. The AF damping structure 237 may providing damping of movement of the optics assembly 102 in the z-direction. The suspension assembly 419 may retain the optics assembly 102 within a z-range of motion relative to the shield can 310. As shown in FIG. 5B and described herein, the suspension assembly 419 may include a configuration that is not vertically aligned with the AF damping structure 237 and is also not vertically aligned with the spaces above the substrate 234 that are approximately ninety (90) degrees out of alignment with the AF damping structure 237. This feature may provide additional shoulder height savings for the camera module 1100 compared to the camera module 100. As shown in FIG. 5B, the electronic components 239 be positioned (e.g., have an attachment position, have a location) outside the volumes 442a and/or 442b where more vertical spaces is present. By restricting the electronic components 237 from being with the volumes 442a and/or 442b, a shoulder height of the camera 1100 may be reduced from the first shoulder height 240a to the second shoulder height 240b by a shoulder height difference 240c.

For example, as shown in FIG. 11, the electronic components 239 may have an attachment position (e.g., surface mounted (SMT)) and/or may be located outside of the volumes 442a and/or 442b and may be ninety (90) degrees out of vertical alignment with the AF damping structure 237. The position of the electronic components 237 at the space above the substrate 234 and outside the volumes 442a and/or 442b may provide a shoulder height of the camera 1100 that is reduced from the first shoulder height 240a to the second shoulder height 240b by a shoulder height difference 240c.

In addition, the camera 1100 may include a circuit board 1102. The circuit board 1102 may be a vertical circuit board. As shown in FIG. 11, the circuit board 1102 may be vertically positioned adjacent the shield can 310 without requiring additional vertical or horizontal space within the camera 1100. The circuit board 1102 may be coupled (e.g., attached) to the electrical connection 217 and be in electronic communication with the electronic components 237 on the substrate 234. For example, the circuit board 1102 may in electronic communication with the electronic components 237 on the substrate 234 via the flexure 220. For instances, the circuit board 1102 may in electronic communication with the electronic components 237 on the substrate 234 via the static platform 215, the flexure arms 224 (e.g., one or more electrical traces 216 on the flexure arms 224), and the dynamic platform 221. In some aspects, the circuit board 1102 may include a driver 1104. The driver 1104 may be SMT to the circuit board 1102. Additionally, or alternatively, the circuit board 1102 may include one or more other electronic components as described herein. The circuit board 1102 may provide electronic communication between the driver 1104 and one or more electronic components 239, the image sensor 208, one or more position sensors, and/or the like via the flexure 220. Additionally, or alternatively, the circuit board 1102 may include one or more other electronic components as described herein and provide electronic communication between the circuit board 1102 and the electronic components on the substrate 234 and/or the dynamic platform 221 of the flexure 220. In some aspects, the flexure arms 224 of the flexure 220 may include one or more high-speed data links (HS-DLs) for electronic communication between the circuit board 1102 and electronic components attached to the substrate 234 and/or the dynamic platform 221 of the flexure 220. By moving the driver 1104 and/or other electronic components to the circuit board 1102, additional z-direction space of the camera 1100 may be conserved to reduce a shoulder height of the shield can 310 and thus the camera 1100. In some aspects, due to the circuit board 1102, the mounted driver 1104, and the use of one or more HS-DLs, the flexure arms 224 and associated electrical traces 216 of the flexure arms 224 may have more bandwidth for other electronic communications. In some aspects, fewer flexure arms and associated electrical traces 216 may be need thereby reducing the size of the flexure 220 the x-y directions.

FIGS. 12A and 12B illustrate components of an example circuit board 1102 for a camera with a reduced shoulder height according to at least some embodiments. FIG. 12A shows a perspective view of an example vertical circuit board. FIG. 12B shows a perspective view of an example vertical circuit board including circuit board arms and position sensors. The circuit board 1102 may be included with any one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 11, 13, 14, 15A, 15B, 16A, 16B, 17A, 17B, 18A, 18B, 19, 20, 21, 22, 23, and 24. The example X-Y-Z coordinate system shown in FIGS. 12A and 12B may be used to discuss aspects of components and/or systems, and may apply to embodiments described throughout this disclosure.

As shown in FIG. 12A, the circuit board 1102 may include a driver 1104 SMT to the circuit board 1102. Additionally, or alternatively, the circuit board 1102 may include one or more other electronic components as described herein. The circuit board 1102 may provide electronic communication between the driver 1104 and one or more electronic components 239, the image sensor 208, one or more position sensors, and/or the like via the flexure 220. Additionally, or alternatively, the circuit board 1102 may include one or more other electronic components as described herein and provide electronic communication between the circuit board 1102 and the electronic components on the substrate 234 and/or the dynamic platform 221 of the flexure 220. In some aspects, the flexure arms 224 of the flexure 220 may include one or more high-speed data links (HS-DLs) for electronic communication between the circuit board 1102 and electronic components attached to the substrate 234 and/or the dynamic platform 221 of the flexure 220.

As shown in FIG. 12B, the circuit board 1102 may include the driver 1104 SMT to the circuit board 1102. Additionally, or alternatively, the circuit board 1102 may include one or more other electronic components as described herein. The circuit board 1102 may provide electronic communication between the driver 1104 and one or more electronic components 239, the image sensor 208, one or more position sensors, and/or the like via the flexure 220. Additionally, or alternatively, the circuit board 1102 may include one or more other electronic components as described herein and provide electronic communication between the circuit board 1102 and the electronic components on the substrate 234 and/or the dynamic platform 221 of the flexure 220. In some aspects, the flexure arms 224 of the flexure 220 may include one or more high-speed data links (HS-DLs) for electronic communication between the circuit board 1102 and electronic components attached to the substrate 234 and/or the dynamic platform 221 of the flexure 220. In some aspects, circuit board arms 1202 and 1204 may be extend from the circuit board to wrap at least partially around an interior of the shield can 310. In some aspects, the circuit board arms 1202 and 1204 may include position sensors 1206 to determine one or more position parameters of the image sensor 208, for example, and/or any other components of the camera 1100. The circuit board arms 1202 and 1204 may be provide electronic communication between the position sensors 1206 and electronic components SMT on the circuit board 1102 and/or electronic components (e.g., electronic components 239) attached the substrate 234 and/or the dynamic platform 221.

In some embodiments, the circuit board 1102 may provide electronic communication between the driver 1104 and the plurality of remote position sensors and electronic communication between the driver 1104 the camera system. In some embodiments, the circuit board 1102 may provide electronic communication between the image sensor 208, the driver 1104, and the camera system. In some aspects, as described herein, an analog front end (AFE) component and a remote sensing data link (RSD-L) component may be embedded in the image sensor 208 and a plurality of remote position sensors may be in electrical communication with the driver 1104 via the AFE component and the RSD-L component, the flexure 220, the electronic connection 217, and the circuit board 1102. In some aspects, an RSD-L component may be embedded in each remote position sensor of the plurality of remove position sensors and the plurality of remote position sensors may be in electrical communication with the driver 1104 via the RSD-L component, the flexure 220, the electronic connection 217, and the circuit board 1102. In some cases, the plurality of remote position sensors may be in electronic communication with the driver 1104 via the RSD-L components and decoupling capacitors, respectively in addition to the flexure 220, the electronic connection 217, and the circuit board 1102. In some cases, an AFE component and an RSD-L component are surface mounted (SMT) to the substrate 234. The plurality of remote position sensors may be in electrical communication with the driver 1104 via the AFE component and the RSD-L in addition to the flexure 220, the electronic connection 217, and the circuit board 1102. In some aspects, the AFE component and the RSD-L may be both surface mounted (SMT) to the substrate 234.

Figure 13:
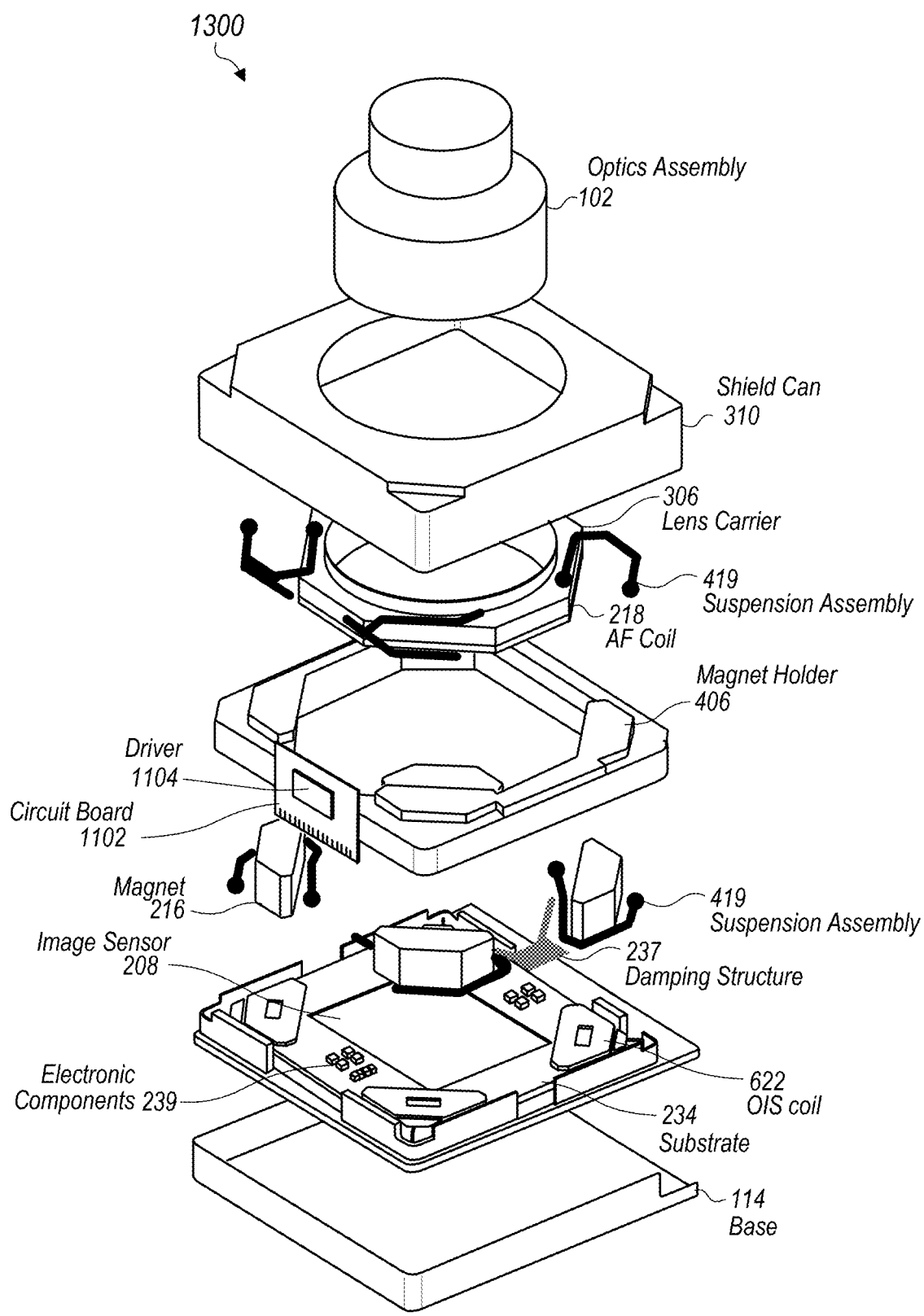
FIGS. 13 and 14 illustrate components of an example camera having a reduced shoulder height and an actuator module or assembly that may, for example, be used to provide autofocus through optics assembly movement and/or optical image stabilization through image sensor movement in small form factor cameras, according to at least some embodiments.

FIG. 13 illustrates an exploded view of an example camera 1300 having an actuator module or assembly that may, for example, be used to provide autofocus through optics assembly movement and/or optical image stabilization through image sensor movement in small form factor cameras, according to at least some embodiments. The camera module 1300 may include one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 11, 12A, 12B, 14, 15A, 15B, 16A, 16B, 17A, 17B, 18A, 18B, 19, 20, 21, 22, 23, and 24. The camera 1300 may include one or more same or similar features as the camera 1100 of FIG. 11. In various embodiments, the camera 1300 may include an optics assembly 102, a shield can 310, a lens carrier 306, the suspension assembly 419, the magnet holder 406, the AF coil 218, the image sensor 208, the magnets 216, the AF damping structure 237, the electronic components 239, the OIS coils 622, the substrate 234, the flexure 220, an OIS base, and the base 314. Also, the camera 1300 may include circuit 1102 and the driver 1104. As shown in FIG. 13, the circuit board 1102 may positioned adjacent an inner surface of the shield can 310 next to the substrate 234 and the AF VCM assembly (e.g., the magnet holder 406).

Figure 14:
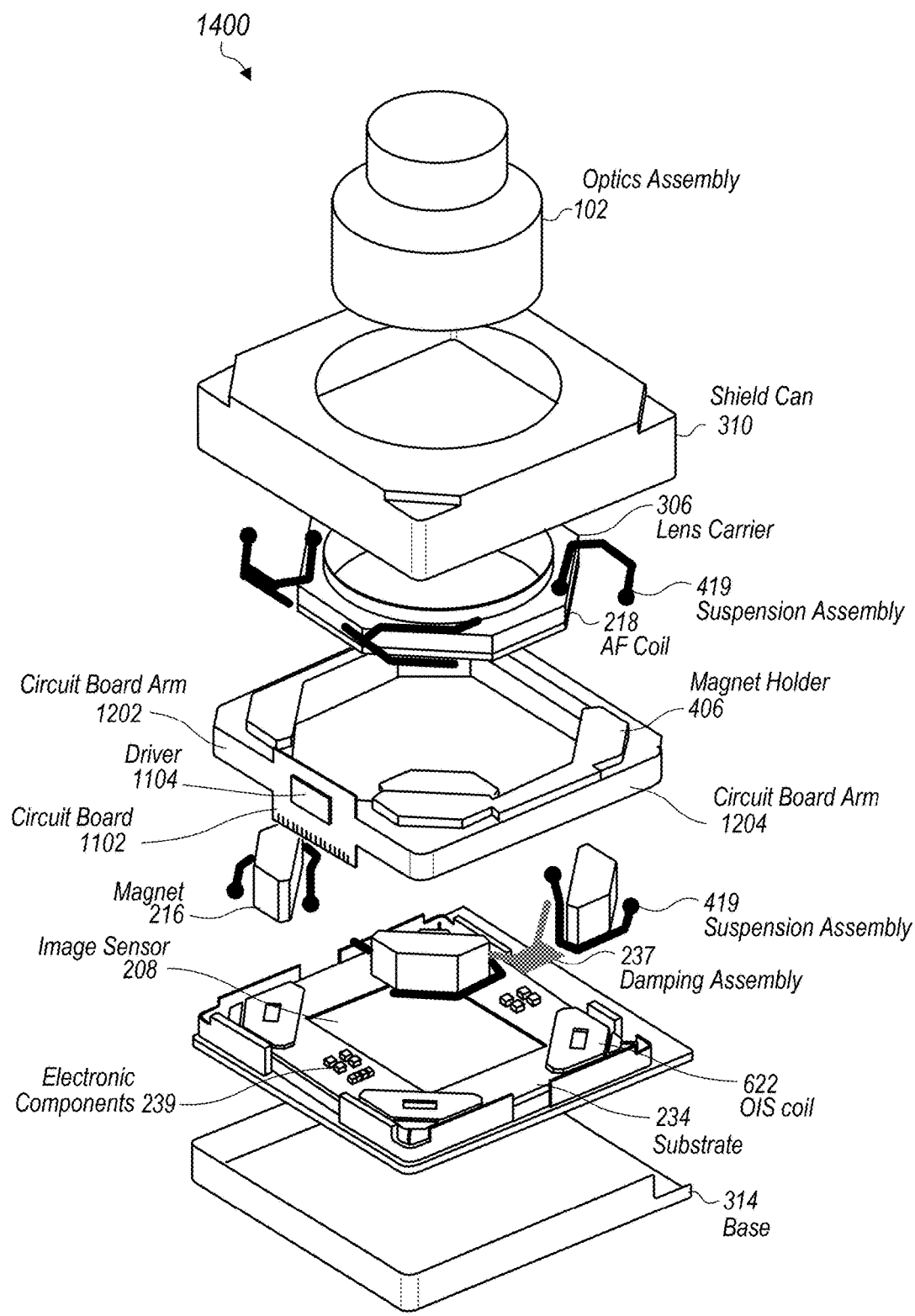

FIG. 14 illustrates an exploded view of an example camera 1400 having an actuator module or assembly that may, for example, be used to provide autofocus through optics assembly movement and/or optical image stabilization through image sensor movement in small form factor cameras, according to at least some embodiments. The camera module 1400 may include one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 11, 12A, 12B, 13, 15A, 15B, 16A, 16B, 17A, 17B, 18A, 18B, 19, 20, 21, 22, 23, and 24. The camera 1400 may include one or more same or similar features as the camera 1100 of FIG. 11 and/or the camera 1300 of FIG. 13. In various embodiments, the camera 1400 may include an optics assembly 102, a shield can 310, a lens carrier 306, the suspension assembly 419, the magnet holder 406, the AF coil 218, the image sensor 208, the magnets 216, the AF damping structure 237, the electronic components 239, the OIS coils 622, the substrate 234, the flexure 220, an OIS base, and the base 314. Also, the camera 1400 may include circuit 1102 and the driver 1104. As shown in FIG. 14, the circuit board 1102 may positioned adjacent an inner surface of the shield can 310 next to the substrate 234 and the AF VCM assembly (e.g., the magnet holder 406). The circuit board arms 1202 and 1204 may extend from the circuit board 1102 and extend around at least a portion of the perimeter of the substrate 234 and the AF VCM assembly near an inner surface of the shield can 310. In some aspects, the circuit board arms 1202 and 1204 may include position sensors 1206 to determine one or more position parameters of the image sensor 208, for example, and/or any other components of the camera 1400. The circuit board arms 1202 and 1204 may be provide electronic communication between the position sensors 1206 and electronic components SMT on the circuit board 1102 and/or electronic components (e.g., electronic components 239) attached the substrate 234 and/or the dynamic platform 221.

Figure 15A:
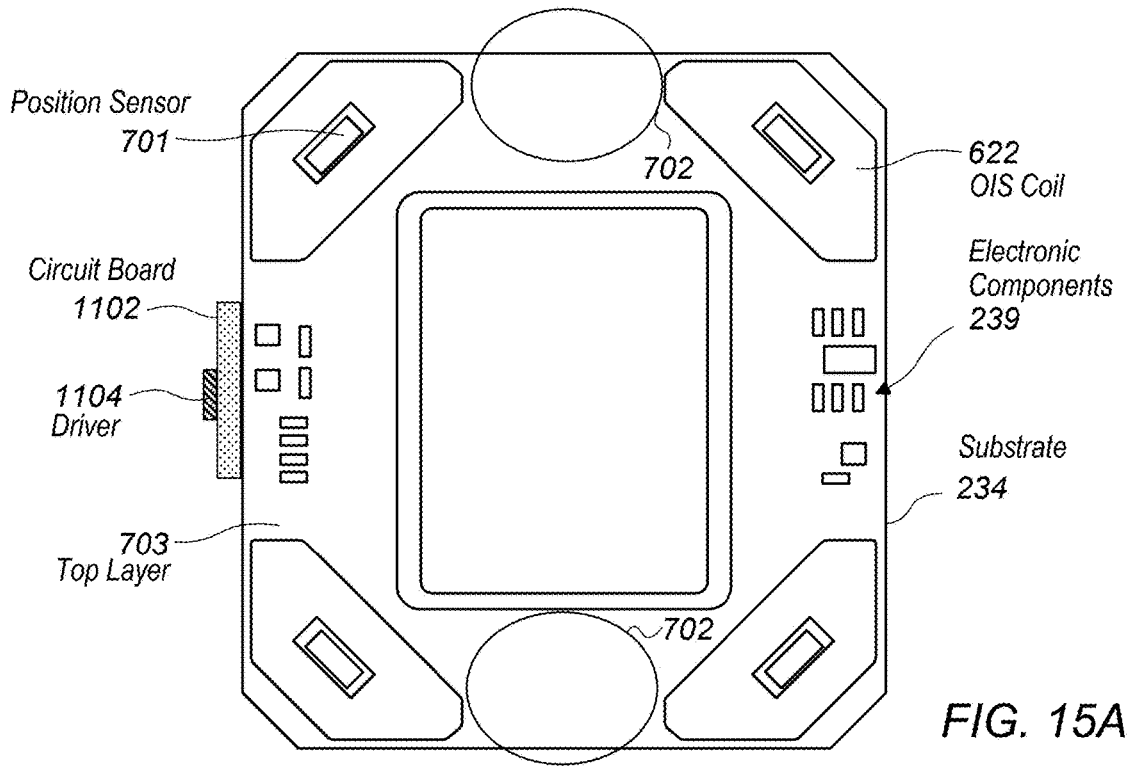
FIGS. 15A and 15B illustrates components of an example substrate architecture according to at least some embodiments.
Figure 15B:
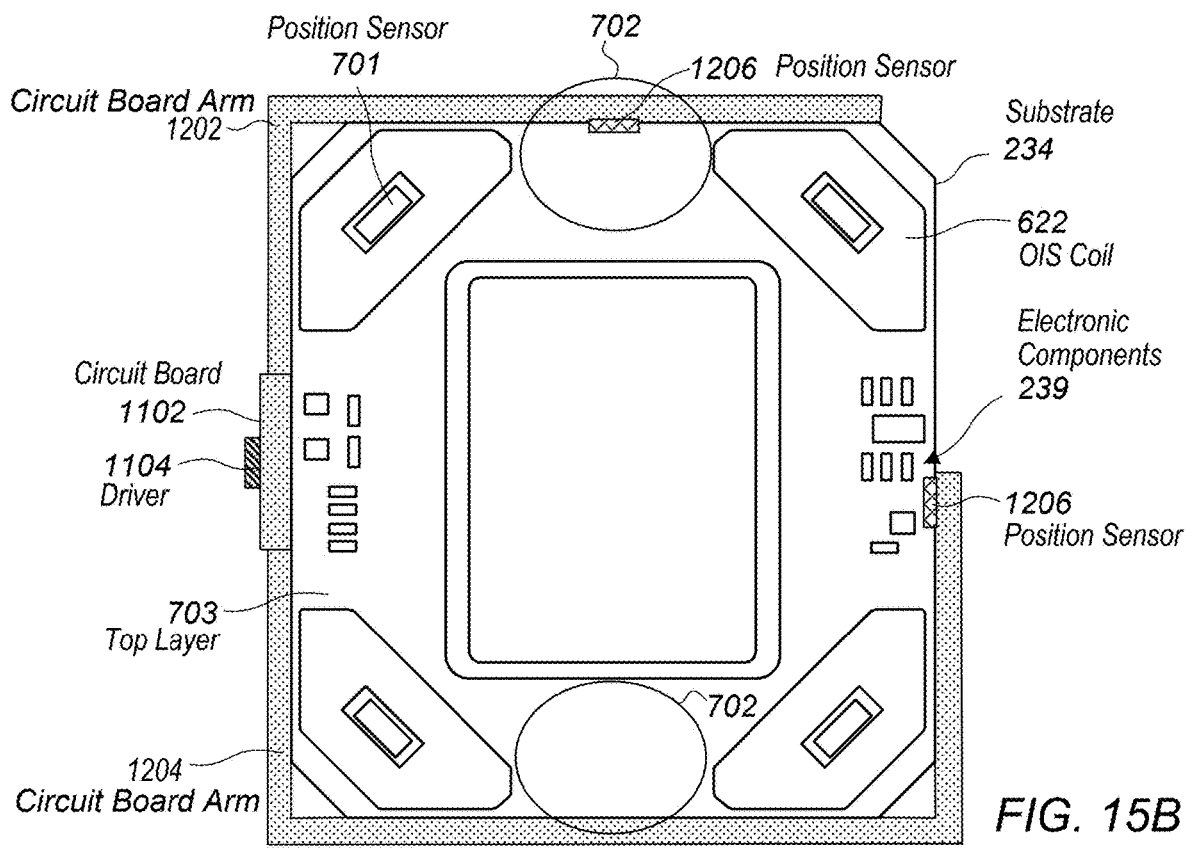

FIGS. 15A and 15B illustrates components of an example substrate architecture according to at least some embodiments. FIG. 15A shows components of an example substrate architecture including the circuit board of FIG. 12A. FIG. 15B shows components of an example substrate architecture including the circuit board of FIG. 12B. The features of the example substrate architecture illustrated in FIGS. 15A and 15B may include one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 11, 12A, 12B, 13, 14, 16A, 16B, 17A, 17B, 18A, 18B, 19, 20, 21, 22, 23, and 24.

As shown in FIG. 15A, the substate 234 may include electronic components 239 SMT to a top surface (e.g., exposed to an area including the damping structure 237) of the top layer 703, and the area 702 indicating the vertical location of the damping structure 237, as discussed herein. The substrate 234 may also include OIS coils 622 and position sensors 701. In some aspects, the position sensors 701 may be connected as analog output to the image sensor 208. The position sensors 701 may also be used for remote sensing as described herein. The electronic components 239 may be in a location that is about ninety (90) degrees out of alignment with area 702 (e.g., where the AF damping structure 237 may be located) providing z-direction space savings (e.g., about 100 μm). In addition, as shown in FIG. 15A, the circuit board 1102 including the driver 1104 may be positioned adjacent the substrate 234 and adjacent an interior surface of the shield can 310. As shown in FIG. 15B, the circuit board 1102 including the driver 1104 may at least partially surround the substrate 234 and the AF VCM assembly using the circuit board arms 1202 and 1204. Position sensors 1206 may be mounted to the circuit board arms 1202 and 1204 as described herein. In some aspects, the example substrate architecture illustrated in FIGS. 15A and 15B may include one or more same or similar features as the features of the example substrate architecture illustrated in FIGS. 7A and 7B.

Figure 16A:
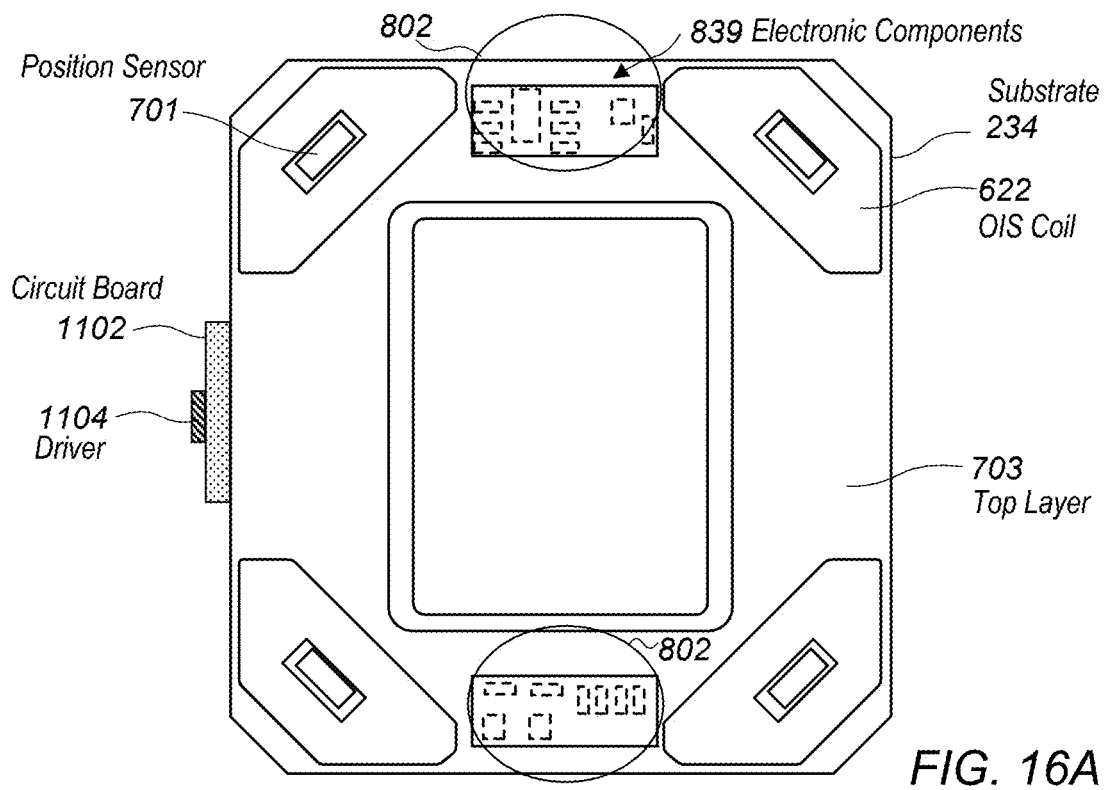
FIGS. 16A and 16B illustrates components of an example substrate architecture according to at least some embodiments.
Figure 16B:
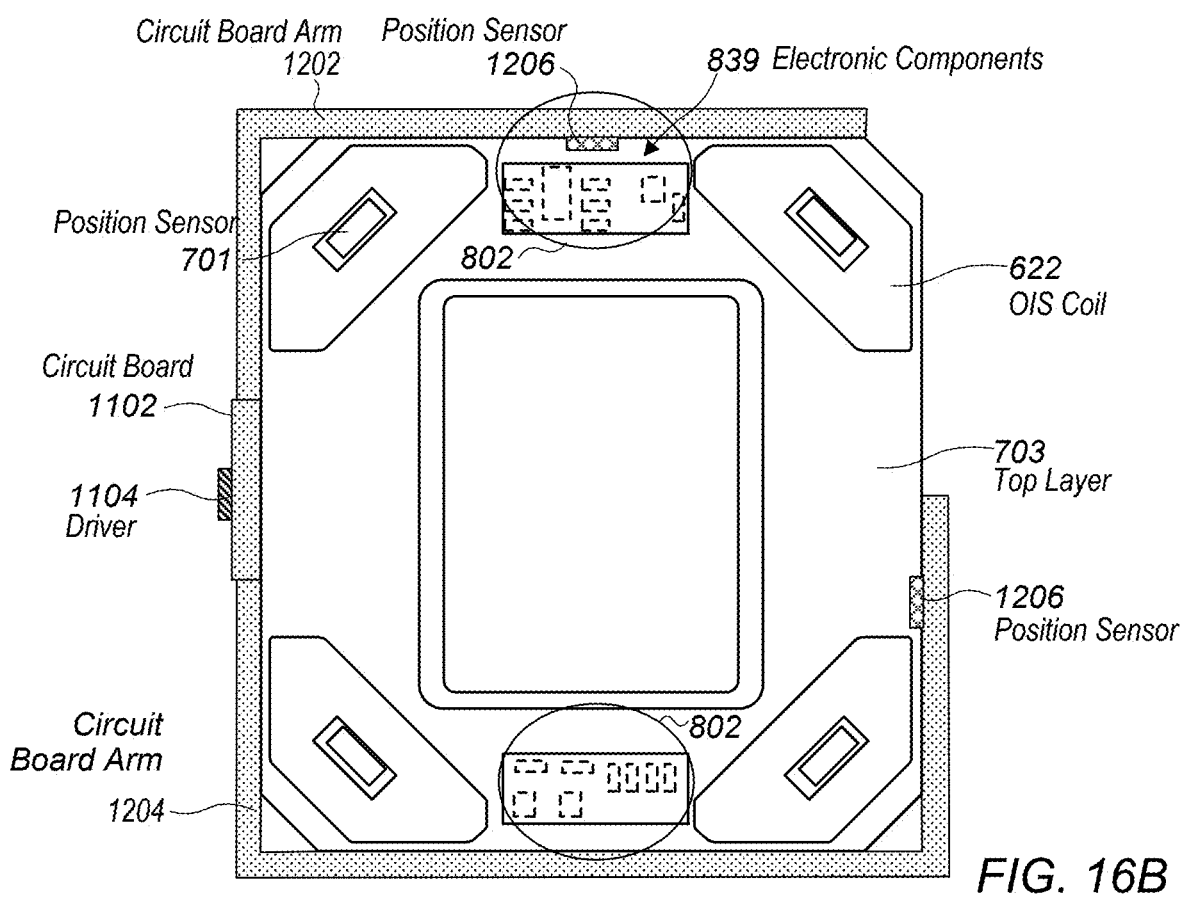

FIGS. 16A and 16B illustrates components of an example substrate architecture according to at least some embodiments. FIG. 16A shows components of an example substrate architecture including the vertical circuit board of FIG. 12A. FIG. 16B shows components of an example substrate architecture including the vertical circuit board of FIG. 12B. The features of the example substrate architecture illustrated in FIGS. 16A and 16B may include one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 11, 12A, 12B, 13, 14, 15A, 15B, 17A, 17B, 18A, 18B, 19, 20, 21, 22, 23, and 24.

As shown in FIGS. 16A and 16B, the substrate 234 may include electronic components 239. The electronic components 839 may be in a location that is approximately in alignment with area 802 (e.g., where the AF damping structure 237 may be located). The electronic components 839 may be located adjacent a bottom block 705 and SMT against a surface of the top layer 703 of the substrate 234 (e.g., a bottom side of the top layer 703) opposite the damping structure 237 (e.g., rather than a top side of top layer 703 of the substrate 234). In some aspects, the substrate 234 may include an embedded OIS coils 622 and position sensors 701 surface mounted (SMT) on a bottom side of the top layer 703, on a bottom side of the bottom block 705, and/or in a cut out through the top layer 703 of the substrate 234. The position sensors 701 may be connected as analog output to the image sensor. The position sensors 701 may also be used for remote sensing as described herein. The electronic components 839 may be in a location that is approximately in alignment with area 802 (e.g., where the AF damping structure 237 may be located). The electronic components 839 may be providing z-direction space savings (e.g., from about 200 μm to about 300 μm). In addition, as shown in FIG. 15A, the circuit board 1102 including the driver 1104 may be positioned adjacent the substrate 234 and adjacent an interior surface of the shield can 310. As shown in FIG. 15B, the circuit board 1102 including the driver 1104 may at least partially surround the substrate 234 and the AF VCM assembly using the circuit board arms 1202 and 1204. Position sensors 1206 may be mounted to the circuit board arms 1202 and 1204 as described herein. In some aspects, the example substrate architecture illustrated in FIGS. 16A and 16B may include one or more same or similar features as the features of the example substrate architecture illustrated in FIGS. 8A and 8B.

Figure 17A:
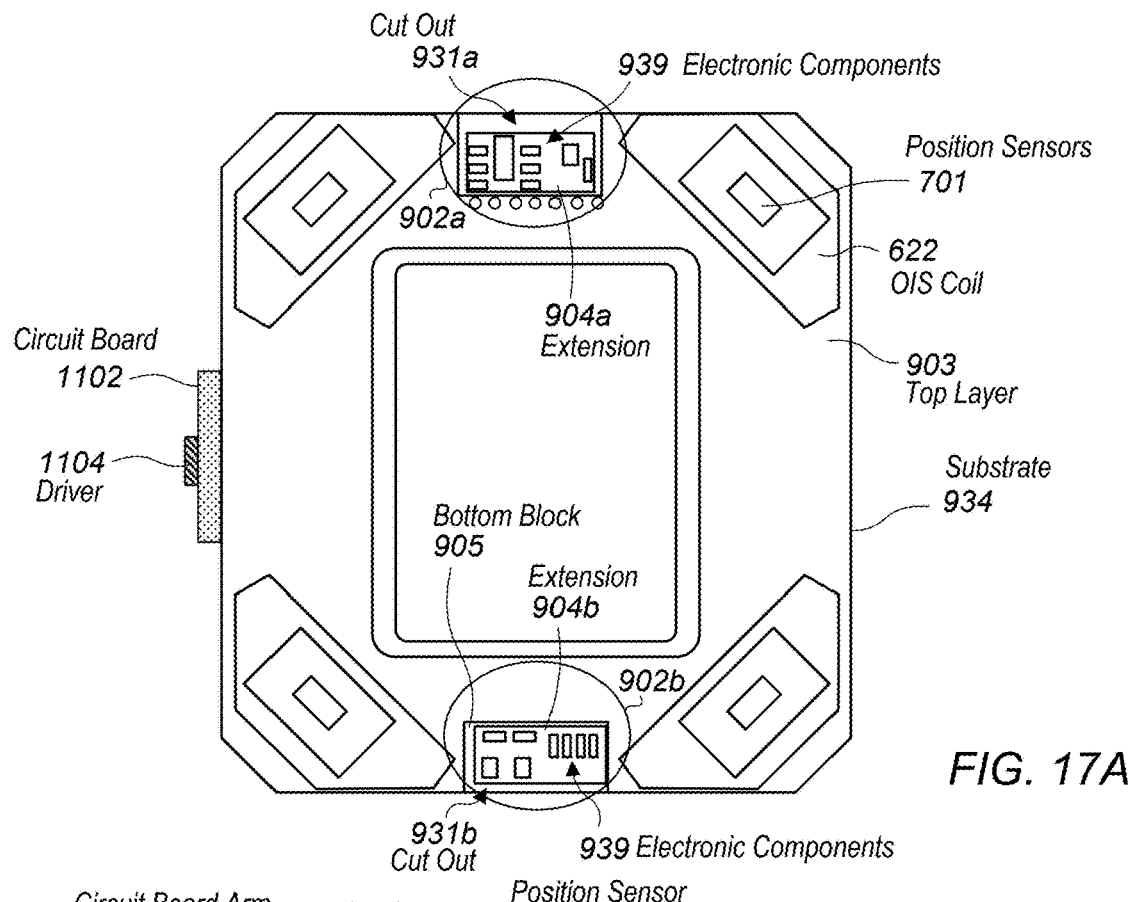
FIGS. 17A and 17B illustrates components of an example substrate architecture according to at least some embodiments.
Figure 17B:
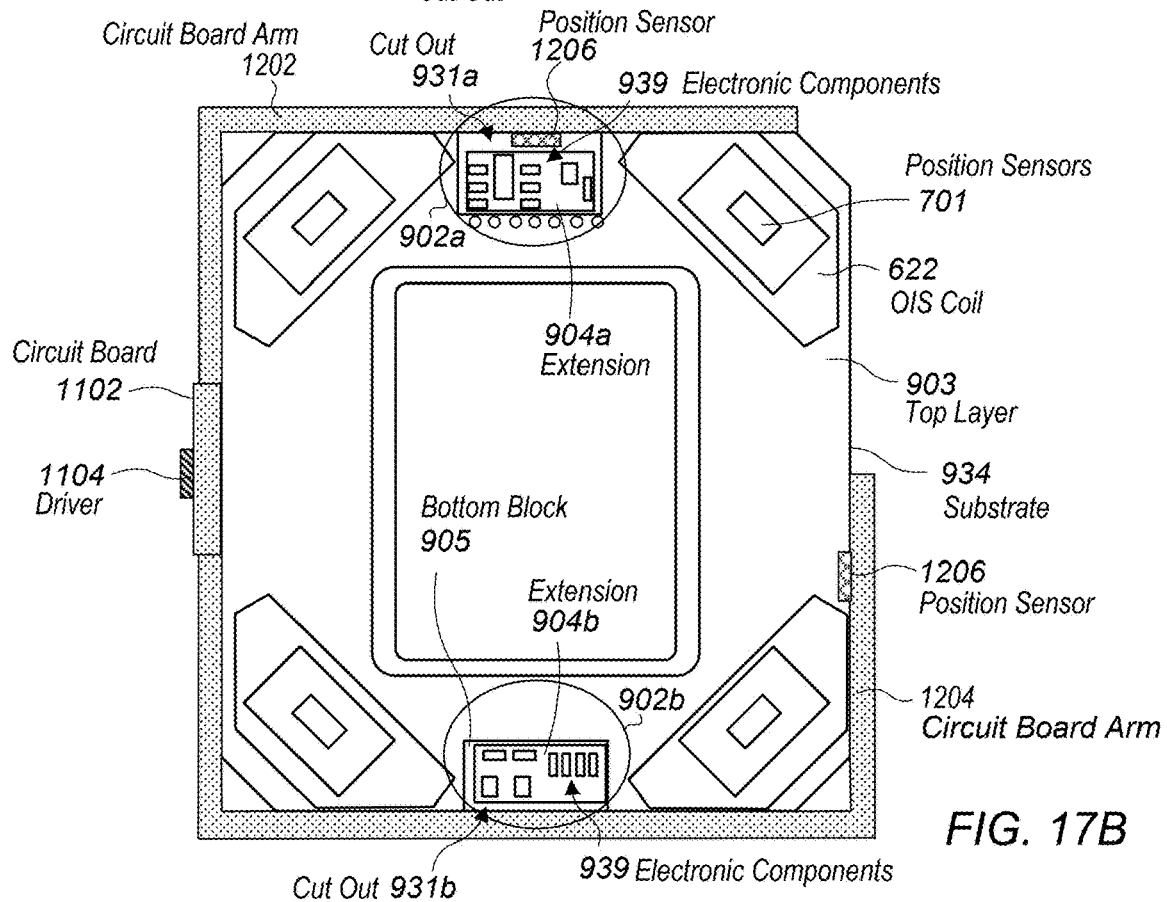

FIGS. 17A and 17B illustrates components of an example substrate architecture according to at least some embodiments. FIG. 17A shows components of an example substrate architecture including the vertical circuit board of FIG. 12A. FIG. 17B shows components of an example substrate architecture including the vertical circuit board of FIG. 12B. The features of the example substrate architecture illustrated in FIGS. 17A and 17B may include one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 11, 12A, 12B, 13, 14, 15A, 15B, 16A, 16B, 18A, 18B, 19, 20, 21, 22, 23, and 24.

With respect to FIGS. 17A and 17B, the substrate 934 may include a top layer 903 located above the bottom block 905. The top layer 903 may include a cutouts 931a and 931b extending through the top layer 903 and aligned with areas 902a and 902b (e.g., where the AF damping structure 237 may be located). The bottom block 905 may include extensions 904a and 904b that are also approximately aligned with the areas 902a and 902b. Electronic components 939 may be SMT to the extensions 904a and 904b of the bottom block 905. The electronic components 939 SMT on the extensions 904a and 904b may extend in the z-direction at least partially through the cut outs 931a and 931b. Because the electronic components 939 are adjacent the top layer 903 of the substrate 934 and SMT to the extensions 904a and 904b while extending at least partially through the cut outs 931a and 931b, a small amount of z-direction space may be used to accommodate the damping structure 237, the top layer 903, the bottom block 905, the electronic components 939, and the flexure 220 providing z-direction space savings (e.g., from about 200 µm to about 300 µm). In some aspects, the substrate 934 may include an embedded OIS coils 622 and position sensors 701 surface mounted (SMT) on a bottom side of the top layer 903, on a bottom side of the bottom block 905, and/or in a cut out 931a and 931b through the top layer 903. The position sensors 701 may be connected as analog output to the image sensor as described herein. The position sensors 701 may also be used for remote sensing as described herein. In addition, as shown in FIG. 17A, the circuit board 1102 including the driver 1104 may be positioned adjacent the substrate 934 and adjacent an interior surface of the shield can 310. As shown in FIG. 17B, the circuit board 1102 including the driver 1104 may at least partially surround the substrate 934 and the AF VCM assembly using the circuit board arms 1202 and 1204. Position sensors 1206 may be mounted to the circuit board arms 1202 and 1204 as described herein. In some aspects, the example substrate architecture illustrated in FIGS. 17A and 17B may include one or more same or similar features as the features of the example substrate architecture illustrated in FIGS. 9A and 9B.

Figure 18A:
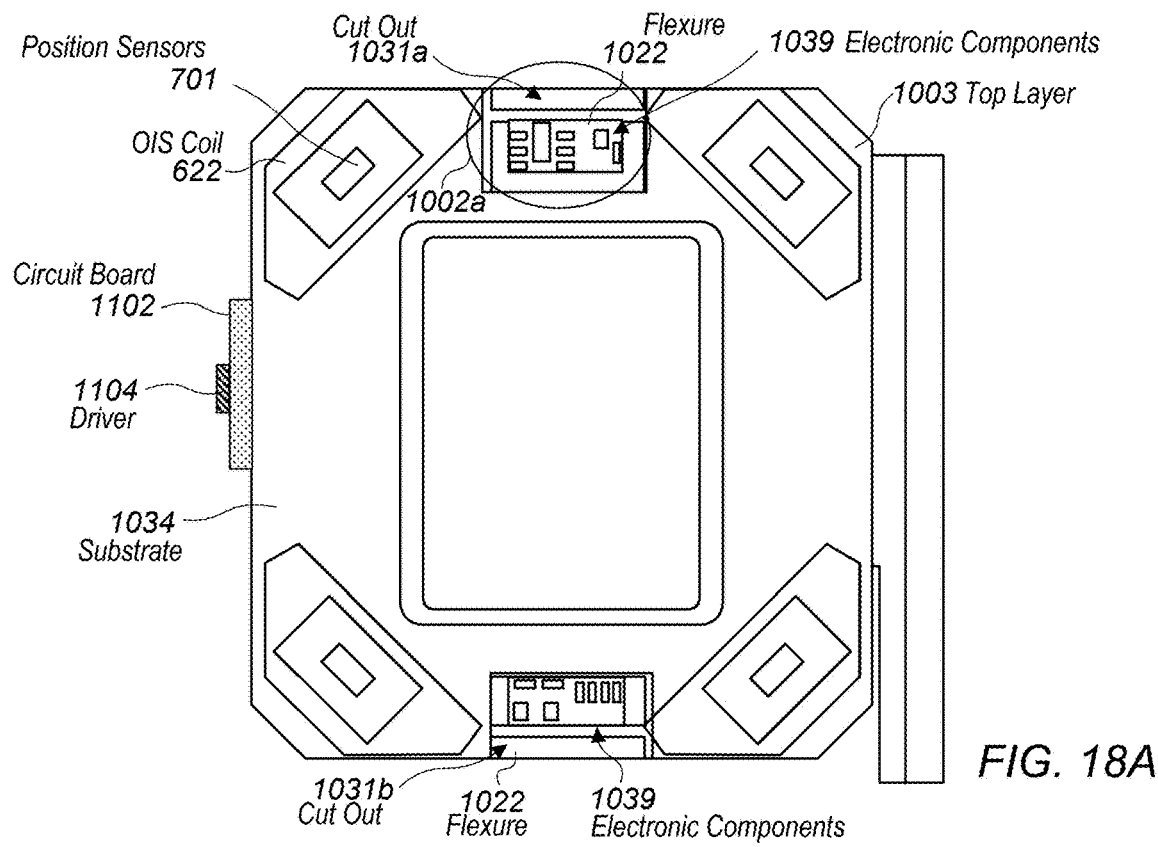
FIGS. 18A and 18B illustrates components of an example substrate architecture according to at least some embodiments.
Figure 18B:
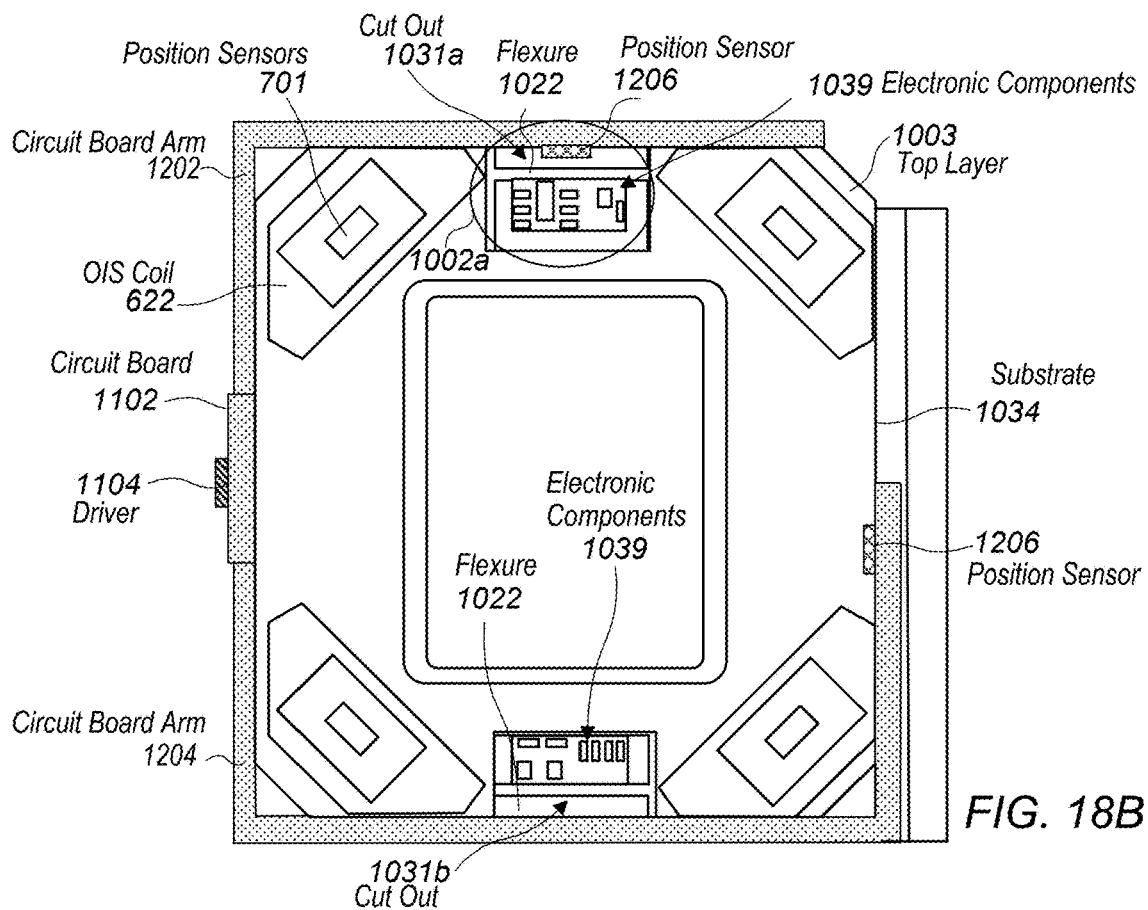

FIGS. 18A and 18B illustrates components of an example substrate architecture according to at least some embodiments. FIG. 18A shows components of an example substrate architecture including the vertical circuit board of FIG. 12A. FIG. 18B shows components of an example substrate architecture including the vertical circuit board of FIG. 12B. The features of the example substrate architecture illustrated in FIGS. 18A and 18B may include one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 11, 12A, 12B, 13, 14, 15A, 15B, 16A, 16B, 17A, 17B, 19, 20, 21, 22, 23, and 24.

As shown in FIGS. 18A and 18B, the substrate 1034 may include a top layer 1003 positioned above the bottom block 1005. The top layer 1003 and the bottom layer 1005 may include an cut outs 1031a and 1031b extending through the top layer 703 and the bottom block 1005 and aligned with an areas 1002a and 100b (e.g., where the AF damping structure 237 may be located). A flexure 1020 may include electronic components 1039 (e.g., which may include one or more same or similar features as the electronic components 239, the electronic components 639, and/or the electronic components 739) SMT to a dynamic portion of the flexure 1020. The electronic component 1039 SMT on the flexure 1020 extend in the z-direction at least partially through the cutouts 1031a and 1031b. Because the electronic components 1039 are adjacent the top layer 1003 of the substrate 1034 and the bottom block 1005 while extending at least partially through the cut outs 1031a and 1031b, a small amount of z-direction space may be used to accommodate the damping structure 237, the top layer 1003, the bottom block 1005, the electronic components 1039, and the flexure 1020 providing z-direction space savings (e.g., as little as about 400 µm). In some aspects, the substrate 1034 may include an embedded OIS coils 622 and position sensors 701 surface mounted (SMT) on a bottom side of the top layer 1003, on a bottom side of the bottom block 1005, and/or in a cut out through the top layer 1003 and the bottom block 1005. The position sensors 701 may be connected as analog output to the image sensor. The position sensors 701 may also be used for remote sensing as described herein. In addition, as shown in FIG. 18A, the circuit board 1102 including the driver 1104 may be positioned adjacent the substrate 1034 and adjacent an interior surface of the shield can 310. As shown in FIG. 18B, the circuit board 1102 including the driver 1104 may at least partially surround the substrate 1034 and the AF VCM assembly using the circuit board arms 1202 and 1204. Position sensors 1206 may be mounted to the circuit board arms 1202 and 1204 as described herein. In some aspects, the example substrate architecture illustrated in FIGS. 18A and 18B may include one or more same or similar features as the features of the example substrate architecture illustrated in FIGS. 10A and 10B.

Figure 19:
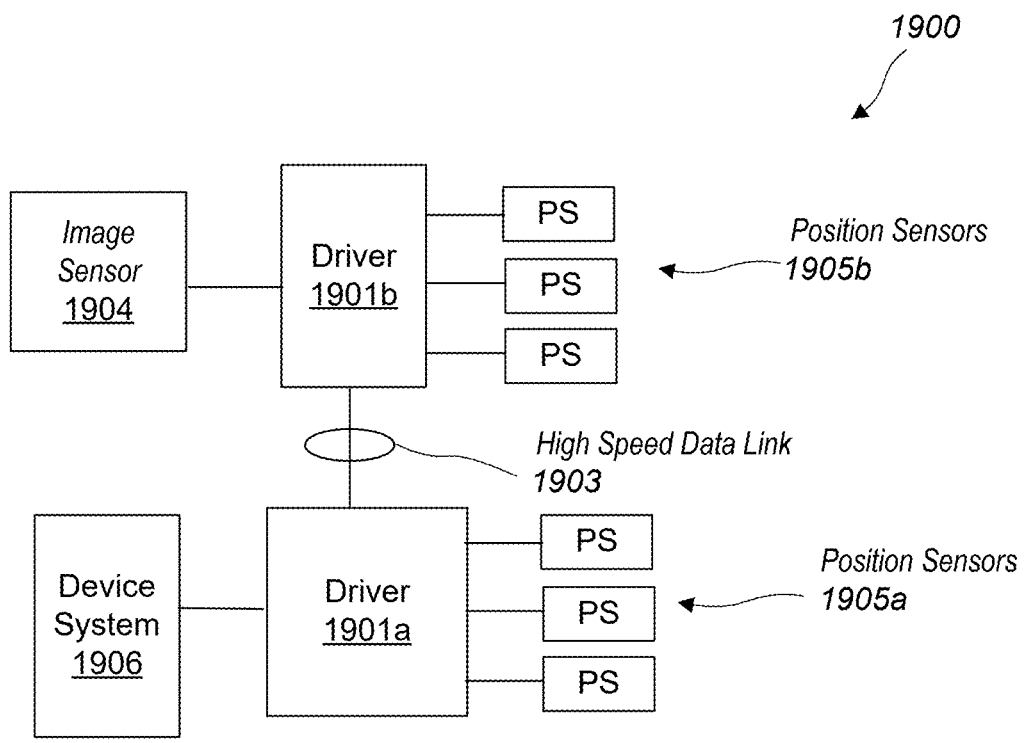
FIG. 19 illustrates a conceptual diagram of an example driver and image sensor configuration with remote sensing, according to at least some embodiments.

FIG. 19 illustrates a conceptual diagram of an example driver and image sensor configuration 1900 with remote sensing, according to at least some embodiments. The components of the example driver and image sensor configuration 1900 with remote sensing illustrated in FIG. 19 may include one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 11, 12A, 12B, 13, 14, 15A, 15B, 16A, 16B, 17A, 17B, 18A, 18B, 20, 21, 22, 23, and 24. In some aspects, the configuration 1900 may include a first driver 1901a, a second driver 1901b, an image sensor 1904, a high-speed data link (HS-DL) 1903, a first plurality of position sensors 1905a, a second plurality of position sensor 1905b, and a device system 1906. As shown in FIG. 19, the second driver 1901 may be in electronic communication with the image sensor 1904. The image sensor 1904 may be positioned with a substrate (e.g., substrate 234) as described herein. The second driver 1901b may be positioned with the substrate (e.g., substrate 234) and/or a dynamic platform (e.g., the dynamic platform 221) of a flexure (e.g., the flexure 220). The second driver 1901b may be in electronic communication with the second plurality of position sensors 1905b. The second plurality of position sensors 1905b may be positioned with the substrate to determine OIS movement of the image sensor 1904. The second driver may be in communication with the first driver 1901a via the HS-DL 1903. The HS-DL may be an electronic communication pathway across one or more flexure arms 224 via one or more electrical traces 216. The first driver 1901a may be positioned on the circuit board 1102. The first driver 1901a may be in electronic communication with the first plurality of position sensors 1905a. The first plurality of position sensors 1905a may be positioned to determine AF movement of an optics assembly (e.g., optics assembly 102). The first driver 1901a in communication with the second driver 1901b and the device system 1906 may facilitate electronic communication between the first driver 1901a and the device system 1906 and the second driver 1901b and the device system 1906.

The first driver 1901a and the second driver 1901b may be smaller than a driver dedicated to driving both AF movement and OIS movement. Positioning the first driver 1901a on the circuit board 1102 and the second driver 1901b on the substrate or the flexure may reduce a shoulder height of the camera.

Figure 20:
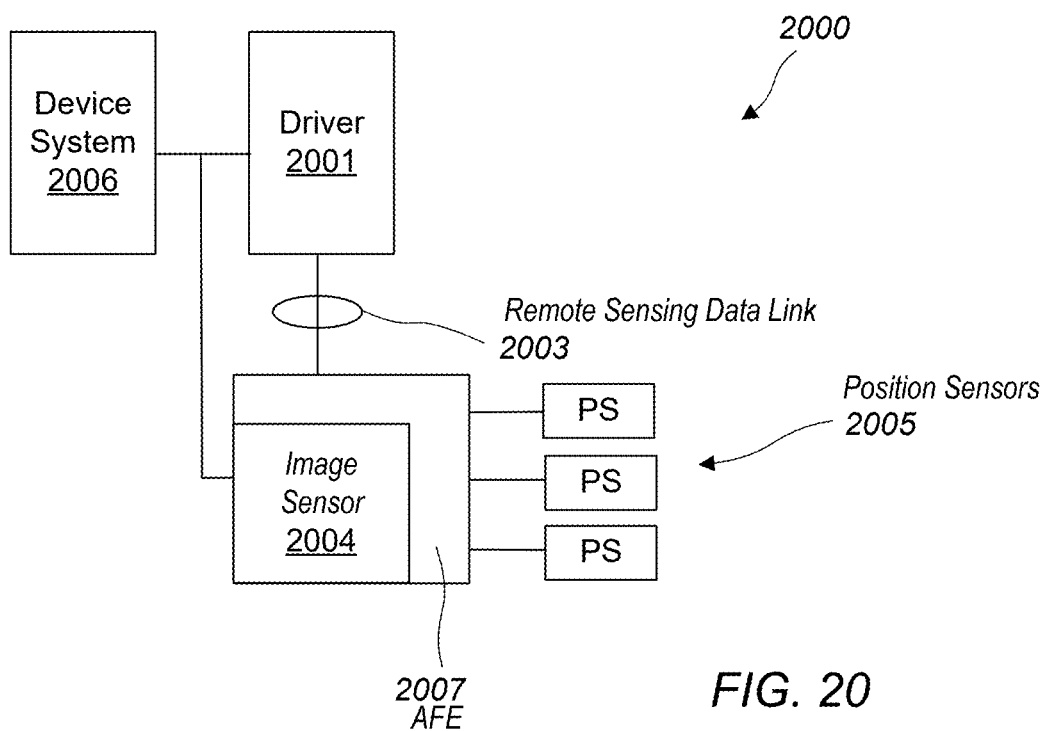
FIG. 20 illustrates a conceptual diagram of an example driver and image sensor configuration with remote sensing, according to at least some embodiments.

FIG. 20 illustrates a conceptual diagram of an example driver and image sensor configuration 2000 with remote sensing, according to at least some embodiments. The components of the example driver and image sensor configuration 2000 with remote sensing illustrated in FIG. 20 may include one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 11, 12A, 12B, 13, 14, 15A, 15B, 16A, 16B, 17A, 17B, 18A, 18B, 19, 21, 22, 23, and 24. In some aspects, the configuration 2000 may include a driver 2001, an image sensor 2004, a remote sensing data link 2003, a plurality of position sensors 2005, and a device system 2006. The driver 2001 may be positioned on the circuit board 1102 and may be in electronic communication with the image sensor 2004 attached to the substrate. The driver 2001 may also be in electronic communication with the device system 2006. The image sensor 2004 may be positioned with a substrate (e.g., substrate 234) as described herein. The image sensor 2004 may include an embedded analog front end (AFE) 2007 that is in communication with the plurality of position sensors 2005 measuring movement (e.g., OIS movement) of the image sensor 2004. The AFE 2007 may receive analog signals from the position sensors 2005, convert those analog signals into digital signal, and send those digital signals to the driver 2001 using the remote sensing data link 2003. In some aspects, the remote sensing data link 2003 may include a high-speed data link over one or more of the flexure arms (e.g., flexure arms 224) of a flexure (e.g., flexure 220). The driver 2001 being positioned on the circuit board 1102 rather than on the substrate or the flexure may reduce a shoulder height of the camera.

Figure 21:
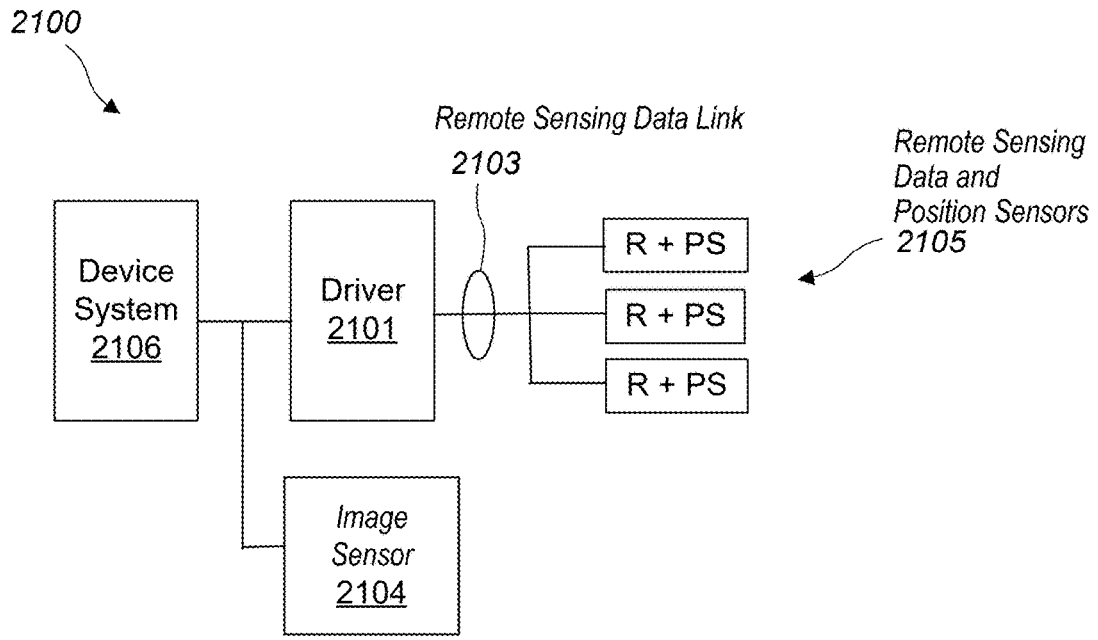
FIG. 21 illustrates a conceptual diagram of an example driver and image sensor configuration with remote sensing, according to at least some embodiments.

FIG. 21 illustrates a conceptual diagram of an example driver and image sensor configuration with remote sensing, according to at least some embodiments. The components of the example driver and image sensor configuration 2100 with remote sensing illustrated in FIG. 21 may include one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 11, 12A, 12B, 13, 14, 15A, 15B, 16A, 16B, 17A, 17B, 18A, 18B, 19, 20, 22, 23, and 24. In some aspects, the configuration 2100 may include a driver 2101, an image sensor 2104, a remote sensing data link 2103, a plurality of position sensors (e.g., remote sensing data and position sensors) 2105, and a device system 2106. The driver 2101 may be positioned on the circuit board 1102 and may be in electronic communication with the image sensor 2104 attached to the substrate. The driver 2101 may also be in electronic communication with the device system 2106. The image sensor 2104 may be positioned with a substrate (e.g., substrate 234) as described herein. The driver 2101 may be in electronic communication with the plurality of position sensors 2105 measuring movement (e.g., OIS movement) of the image sensor 2004 using the remote sensing data link 2003. In some aspects, the remote sensing data link 2003 may include a high-speed data link over one or more of the flexure arms (e.g., flexure arms 224) of a flexure (e.g., flexure 220). In some aspects, the remote sensing data link 2103 may be a serial link. The driver 2101 being positioned on the circuit board 1102 rather than on the substrate or the flexure may reduce a shoulder height of the camera.

Figure 22:
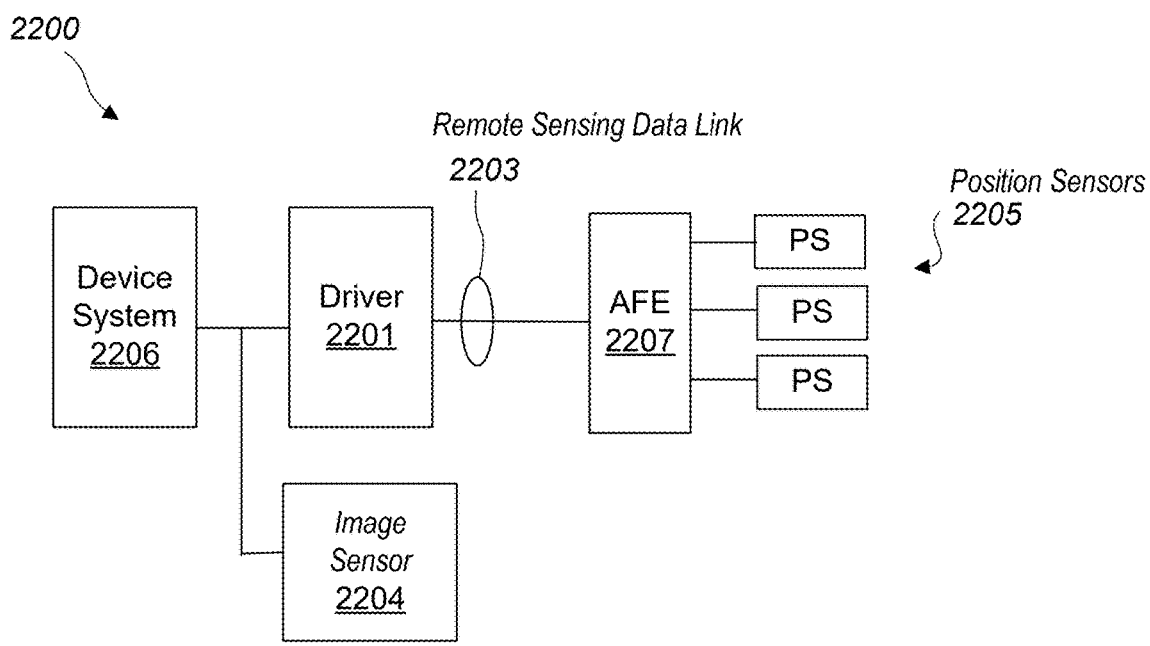
FIG. 22 illustrates a conceptual diagram of an example driver and image sensor configuration with remote sensing, according to at least some embodiments.

FIG. 22 illustrates a conceptual diagram of an example driver and image sensor configuration with remote sensing, according to at least some embodiments. The components of the example driver and image sensor configuration 2100 with remote sensing illustrated in FIG. 22 may include one or more same or similar features as the features described with respect to or illustrated in FIGS. 1, 2A, 2B, 3, 4A, 4B, 5A, 5B, 6, 7A, 7B, 8A, 8B, 9A, 9B, 10A, 10B, 11, 12A, 12B, 13, 14, 15A, 15B, 16A, 16B, 17A, 17B, 18A, 18B, 19, 20, 21, 23, and 24. In some aspects, the configuration 2200 may include a driver 2201, an image sensor 2204, a remote sensing data link 2203, an AFE 2207, a plurality of position sensors 2205, and a device system 2206. The driver 2201 may be positioned on the circuit board 1102 and may be in electronic communication with the image sensor 2204 attached to the substrate. The driver 2201 may also be in electronic communication with the device system 2206. The image sensor 2204 may be positioned with a substrate (e.g., substrate 234) as described herein. The driver 2201 may be in electronic communication with the plurality of position sensors 2105 measuring movement (e.g., OIS movement) of the image sensor 2004 via the AFE 2207 and the remote sensing data link 2003. The AFE 2207 may receive analog signals from the position sensors 2205, convert those analog signals into digital signal, and send those digital signals to the driver 2201 using the remote sensing data link 2203. In some aspects, the remote sensing data link 2203 may include a high-speed data link over one or more of the flexure arms (e.g., flexure arms 224) of a flexure (e.g., flexure 220). In some aspects, the remote sensing data link 2203 may be a serial link. The driver 2201 being positioned on the circuit board 1102 rather than on the substrate or the flexure may reduce a shoulder height of the camera.

Figure 23:
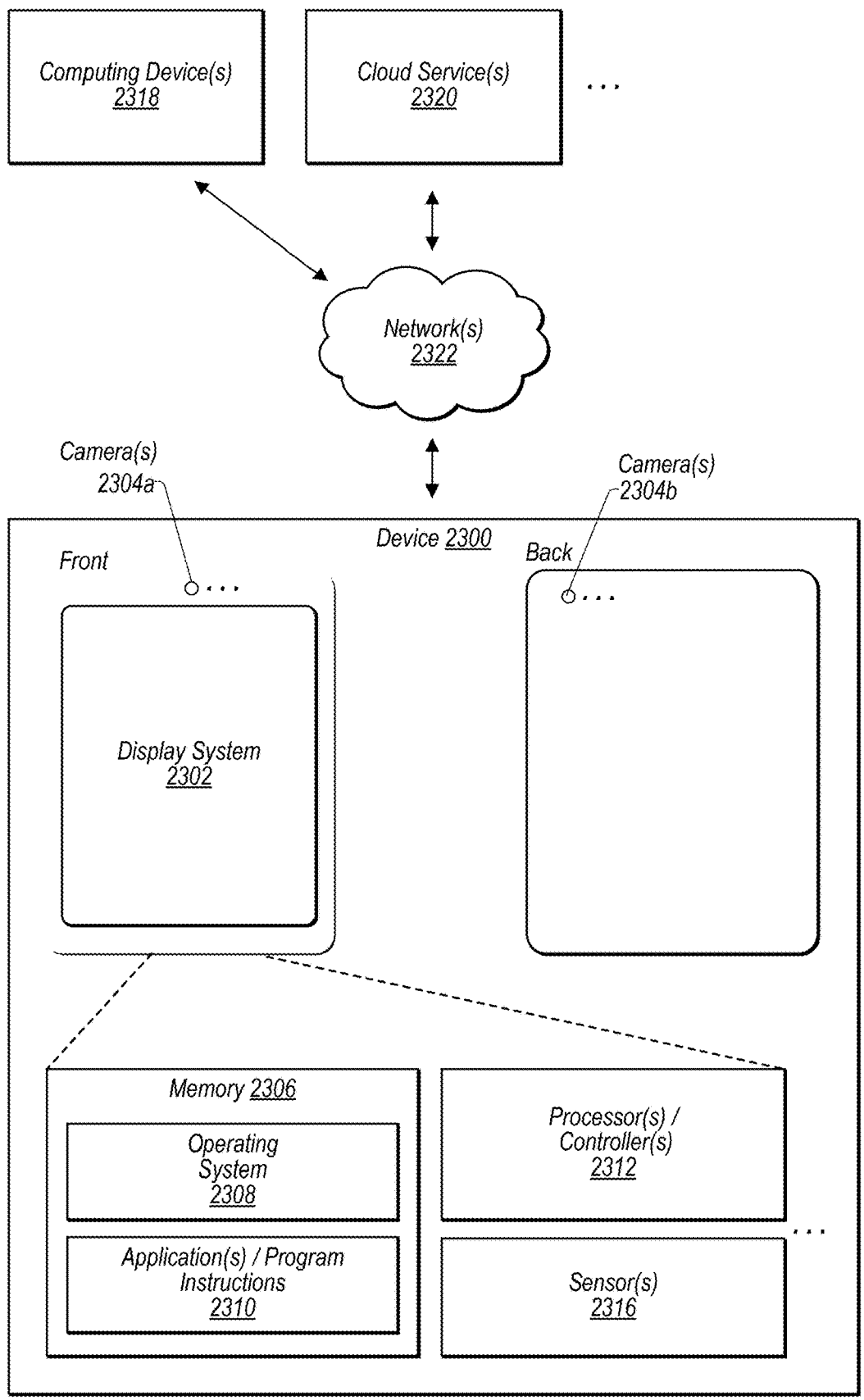
FIG. 23 illustrates a schematic representation of an example device that may include a camera, in accordance with some embodiments.

FIG. 23 illustrates a schematic representation of an example device 2300 that may include a camera (e.g., as described herein with respect to FIGS. 1, 2A, 2B, 3, 4A, 4B, 5A, 5B, 6, 7A, 7B, 8A, 8B, 9A, 9B, 10A, 10B, 11, 12A, 12B, 13, 14, 15A, 15B, 16A, 16B, 17A, 17B, 18A, 18B, 19, 20, 21, 22, and 24, in accordance with some embodiments. In some embodiments, the device 2300 may be a mobile device and/or a multifunction device. In various embodiments, the device 2300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 2300 may include a display system 2302 (e.g., comprising a display and/or a touch-sensitive surface) and/or one or more cameras 2304. In some non-limiting embodiments, the display system 2302 and/or one or more front-facing cameras 2304a may be provided at a front side of the device 2300, e.g., as indicated in FIG. 23. Additionally, or alternatively, one or more rear-facing cameras 2304b may be provided at a rear side of the device 2300. In some embodiments comprising multiple cameras 2304, some or all of the cameras may be the same as, or similar to, each other. Additionally, or alternatively, some or all of the cameras may be different from each other.

In various embodiments, the location(s) and/or arrangement(s) of the camera(s) 2304 may be different than those indicated in FIG. 23.

Among other things, the device 2300 may include memory 2306 (e.g., comprising an operating system 2308 and/or application(s)/program instructions 2310), one or more processors and/or controllers 2312 (e.g., comprising CPU(s), memory controller(s), display controller(s), and/or camera controller(s), etc.), and/or one or more sensors 2316 (e.g., orientation sensor(s), proximity sensor(s), and/or position sensor(s), etc.). In some embodiments, the device 2300 may communicate with one or more other devices and/or services, such as computing device(s) 2318, cloud service(s) 2320, etc., via one or more networks 2322. For example, the device 2300 may include a network interface (e.g., network interface 2310) that enables the device 2300 to transmit data to, and receive data from, the network(s) 2322. Additionally, or alternatively, the device 2300 may be capable of communicating with other devices via wireless communication using any of a variety of communications standards, protocols, and/or technologies.

Figure 24:
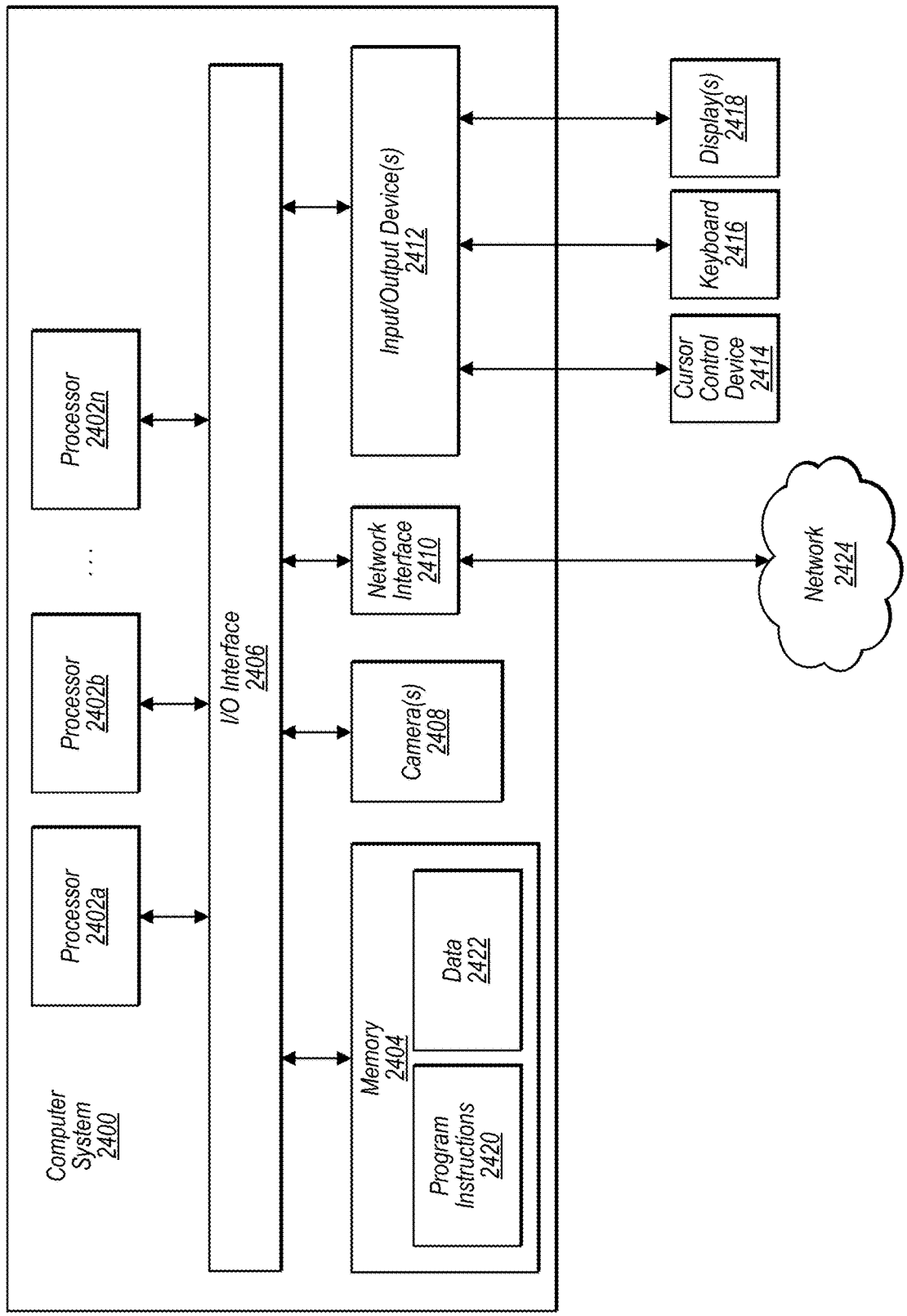
FIG. 24 illustrates a schematic block diagram of an example computing device, referred to as computer system, that may include or host embodiments of a camera, in accordance with some embodiments.

FIG. 24 illustrates a schematic block diagram of an example computing device, referred to as computer system 2400, that may include or host embodiments of a camera (e.g., as described herein with respect to FIGS. 1, 2A, 2B, 3, 4A, 4B, 5A, 5B, 6, 7A, 7B, 8A, 8B, 9A, 9B, 10A, 10B, 11, 12A, 12B, 13, 14, 15A, 15B, 16A, 16B, 17A, 17B, 18A, 18B, 19, 20, 21, 22, and 23). In addition, computer system 2400 may implement methods for controlling operations of the camera and/or for performing image processing images captured with the camera. In some embodiments, the device 2400 (described herein with reference to FIG. 24) may additionally, or alternatively, include some or all of the functional components of the computer system 2400 described herein.

The computer system 2400 may be configured to execute any or all of the embodiments described above. In different embodiments, computer system 2400 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 2400 includes one or more processors 2402 coupled to a system memory 2404 via an input/output (I/O) interface 2406. Computer system 2400 further includes one or more cameras 2408 coupled to the I/O interface 2406. Computer system 2400 further includes a network interface 2410 coupled to I/O interface 2406, and one or more input/output devices 2412, such as cursor control device 2414, keyboard 2416, and display(s) 2418. In some cases, it is contemplated that embodiments may be implemented using a single instance of computer system 2400, while in other embodiments multiple such systems, or multiple nodes making up computer system 2400, may be configured to host different portions or instances of embodiments. For example, in one embodiment some elements may be implemented via one or more nodes of computer system 2400 that are distinct from those nodes implementing other elements.

In various embodiments, computer system 2400 may be a uniprocessor system including one processor 2402, or a multiprocessor system including several processors 2402 (e.g., two, four, eight, or another suitable number). Processors 2402 may be any suitable processor capable of executing instructions. For example, in various embodiments processors 2402 may be general-purpose or embedded processors implementing any of a variety of instruction set architectures (ISAs), such as the x86, PowerPC, SPARC, or MIPS ISAs, or any other suitable ISA. In multiprocessor systems, each of processors 2402 may commonly, but not necessarily, implement the same ISA.

System memory 2404 may be configured to store program instructions 2420 accessible by processor 2402. In various embodiments, system memory 2404 may be implemented using any suitable memory technology, such as static random access memory (SRAM), synchronous dynamic RAM (SDRAM), nonvolatile/Flash-type memory, or any other type of memory. Additionally, existing camera control data 2422 of memory 2404 may include any of the information or data structures described above. In some embodiments, program instructions 2420 and/or data 2422 may be received, sent or stored upon different types of computer-accessible media or on similar media separate from system memory 2404 or computer system 2400. In various embodiments, some or all of the functionality described herein may be implemented via such a computer system 2400.

In one embodiment, I/O interface 2406 may be configured to coordinate I/O traffic between processor 2402, system memory 2404, and any peripheral devices in the device, including network interface 2410 or other peripheral interfaces, such as input/output devices 2412. In some embodiments, I/O interface 2406 may perform any necessary protocol, timing or other data transformations to convert data signals from one component (e.g., system memory 2404) into a format suitable for use by another component (e.g., processor 2402). In some embodiments, I/O interface 2406 may include support for devices attached through various types of peripheral buses, such as a variant of the Peripheral Component Interconnect (PCI) bus standard or the Universal Serial Bus (USB) standard, for example. In some embodiments, the function of I/O interface 2406 may be split into two or more separate components, such as a north bridge and a south bridge, for example. Also, in some embodiments some or all of the functionality of I/O interface 2406, such as an interface to system memory 2404, may be incorporated directly into processor 2402.

Network interface 2410 may be configured to allow data to be exchanged between computer system 2400 and other devices attached to a network 2424 (e.g., carrier or agent devices) or between nodes of computer system 2400. Network 2424 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2410 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2412 may, in some embodiments, include one or more display terminals, keyboards, keypads, touchpads, scanning devices, voice or optical recognition devices, or any other devices suitable for entering or accessing data by one or more computer systems 2400. Multiple input/output devices 2412 may be present in computer system 2400 or may be distributed on various nodes of computer system 2400. In some embodiments, similar input/output devices may be separate from computer system 2400 and may interact with one or more nodes of computer system 2400 through a wired or wireless connection, such as over network interface 2410.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
    a lens carrier to which one or more lenses are mounted, wherein the one or more lenses define an optical axis and the lens carrier and the one or more lenses are movable along the optical axis;
    an autofocus (AF) damping structure configured to dampen motion of the lens carrier and the one or more lens in at least one direction along the optical axis;
    a flexure platform comprising:
        a dynamic platform to which an image sensor and a substrate are connected such that the image sensor and the substrate move together with the dynamic platform,
        a static platform connected to a static portion of the camera, and
        multiple flexure arms that mechanically connect the dynamic platform to the static platform;
    one or more electronic components configured to support actuation of the dynamic platform relative to the static platform; and
    a volume of space vertically aligned with the AF damping structure, wherein the volume of space comprises an open volume of space that extends from the AF damping structure to an upper surface of a top layer of the substrate, and wherein the volume of space does not include a mounting location of the one or more electronic components.

2. The camera of claim 1, wherein the volume of space does not include the one or more electronic components.

3. The camera of claim 1, wherein the one or more electronic components comprise at least one of a driver, a voltage regulator, or a position sensor.

4. The camera of claim 1, wherein the one or more electronic components are mounted to the substrate and ninety degrees about the substrate from the volume of space.

5. The camera of claim 1, wherein the one or more electronic components are mounted to a different surface of the substrate below the upper surface of the top layer of the substrate.

6. The camera of claim 1, wherein the top layer of the substrate comprises a cut out vertically aligned with the AF damping structure, and wherein the one or more electronic components are surface mounted to a layer of the substrate below the top layer of the substrate and extend at least into the cut out.

7. The camera of claim 1, wherein the substrate comprises a cut out vertically aligned with the AF damping structure, and wherein the one or more electronic components are surface mounted to the flexure platform and extend at least into the cut out.

8. The camera of claim 1, further comprising a vertical circuit board positioned adjacent the volume of space and in electronic communication with the substrate via the flexure platform, wherein at least one electronic component of the one or more electronic components is mounted to the vertical circuit board to provide electrical communication between the at least one electronic component and the substrate.

9. The camera of claim 8, wherein the at least one electronic component mounted to the vertical circuit board comprises a driver, wherein one or more position sensors are mounted to the substrate, and wherein the driver is configured to receive position information associated with the image sensor, via a high-speed data link through one or more flexure arms of the multiple flexure arms, from the one or more position sensors.

10. A device, comprising:
one or more processors;
memory storing program instructions executable by the one or more processors to control operation of a camera; and
the camera comprising:
a lens carrier to which one or more lenses are mounted, wherein the one or more lenses define an optical axis and the lens carrier and the one or more lenses are movable in one or more directions along the optical axis;
an autofocus (AF) damping structure configured to dampen motion of the lens carrier and the one or more lens in at least one direction of the one or more directions along the optical axis;
a flexure platform comprising:
a dynamic platform to which an image sensor and a substrate are connected such that the image sensor and the substrate move together with the dynamic platform,
a static platform connected to a static portion of the camera, and
multiple flexure arms that mechanically connect the dynamic platform to the static platform;
one or more electronic components configured to support actuation of the dynamic platform relative to the static platform; and
a volume of space vertically aligned with the AF damping structure, wherein the volume of space comprises an open volume of space that extends from the AF damping structure to an upper surface of a top layer of the substrate, wherein the volume of space does not include a mounting location of the one or more electronic components.

11. The device of claim 10, wherein the volume of space does not include the one or more electronic components.

12. The device of claim 10, wherein the one or more electronic components comprise at least one of a driver, a voltage regulator, or a position sensor.

13. The device of claim 10, wherein the one or more electronic components are mounted to the substrate and ninety degrees about the substrate from the volume of space.

14. The device of claim 10, wherein the one or more electronic components are mounted to a different surface of the substrate below the upper surface of the top layer of the substrate.

15. The device of claim 10, wherein the top layer of the substrate comprises a cut out vertically aligned with the AF damping structure, and wherein the one or more electronic components are surface mounted to a layer of the substrate below the top layer of the substrate and extend at least into the cut out.

16. A camera, comprising:
a lens carrier to which one or more lenses are mounted, wherein the one or more lenses define an optical axis and the lens carrier and the one or more lenses are movable in one or more directions along the optical axis;
an autofocus (AF) damping structure configured to dampen motion of the lens carrier and the one or more lens in at least one direction of the one or more directions along the optical axis;
a flexure platform comprising:
a dynamic platform to which an image sensor and a substrate are connected such that the image sensor and the substrate move together with the dynamic platform,
a static platform connected to a static portion of the camera, and
multiple flexure arms that mechanically connect the dynamic platform to the static platform;
at least one electronic component configured to support actuation of the dynamic platform relative to the static platform; and
a vertical circuit board positioned adjacent the flexure platform and in electronic communication with the substrate via the flexure platform, wherein the at least one electronic component is mounted to the vertical circuit board to provide electrical communication between the at least one electronic component and the substrate.

17. The camera of claim 16, wherein the at least one electronic component mounted to the vertical circuit board comprises a driver, wherein one or more position sensors are mounted to the substrate, and wherein the driver is configured to receive position information associated with the image sensor, via a high-speed data link through one or more flexure arms of the multiple flexure arms, from the one or more position sensors.

18. The camera of claim 17, wherein the driver is configured to receive the position information associated with the image sensor, via the high-speed data link through one or more flexure arms of the multiple flexure arms and an analog front end (AFE), from the one or more position sensors, wherein the AFE is configured to convert an analog signal from the one or more position sensors to a digital signal for reception by the driver.

19. The camera of claim 17, wherein the driver is configured to receive the position information associated with the image sensor, via the image sensor and the high-speed data link through one or more flexure arms of the multiple flexure arms, from the one or more position sensors.

20. The camera of claim 19, wherein the image sensor comprises an AFE configured to convert an analog signal from the one or more position sensors to a digital signal for reception by the driver.

* * * * *